(12) United States Patent
Strunk et al.

(10) Patent No.: US 8,569,425 B2
(45) Date of Patent: Oct. 29, 2013

(54) MODIFIED PHENOLIC RESINS

(75) Inventors: David Strunk, Haan (DE); Gerard Ladegourdie, Düsseldorf (DE); Frank Lenzen, Düsseldorf (DE)

(73) Assignee: Huttenes-Albertus Chemische Werke GmbH, Dusseldorf (DE)

( * ) Notice: Subject to any disclaimer, the term of this patent is extended or adjusted under 35 U.S.C. 154(b) by 0 days.

(21) Appl. No.: 13/165,267

(22) Filed: Jun. 21, 2011

(65) Prior Publication Data

US 2011/0275758 A1 Nov. 10, 2011

Related U.S. Application Data

(63) Continuation of application No. 13/140,795, filed as application No. PCT/EP2009/060751 on Aug. 19, 2009.

(30) Foreign Application Priority Data

Dec. 19, 2008 (DE) .......................... 10 2008 055 042

(51) Int. Cl.
| | |
|---|---|
| *C08G 65/40* | (2006.01) |
| *C08L 83/00* | (2006.01) |
| *B22C 1/18* | (2006.01) |
| *B22C 1/20* | (2006.01) |
| *B22C 9/02* | (2006.01) |

(52) U.S. Cl.
USPC .......................................... 525/393; 164/520

(58) Field of Classification Search
USPC .......................................... 525/393; 164/520
See application file for complete search history.

(56) References Cited

U.S. PATENT DOCUMENTS

| | | | | |
|---|---|---|---|---|
| 2,182,208 | A | 12/1939 | Nason | |
| 2,657,974 | A | 11/1953 | Cook et al. | |
| 3,409,579 | A | 11/1968 | Robins | |
| 3,495,797 | A | 2/1970 | Ganz | |
| 3,676,392 | A | 7/1972 | Robins | |
| 3,839,236 | A * | 10/1974 | Foley et al. | 524/858 |
| 4,022,753 | A | 5/1977 | Lohse et al. | |
| 4,120,847 | A * | 10/1978 | Culbertson | 528/140 |
| 4,157,324 | A * | 6/1979 | Culbertson | 524/361 |
| 4,459,374 | A * | 7/1984 | Nishimura et al. | 523/143 |
| 5,177,157 | A * | 1/1993 | Akamatsu | 525/398 |
| 5,736,619 | A * | 4/1998 | Kane et al. | 525/393 |
| 6,017,978 | A * | 1/2000 | Chen et al. | 523/143 |

(Continued)

FOREIGN PATENT DOCUMENTS

| | | |
|---|---|---|
| DE | 10 2004 057 671 A1 | 6/2006 |
| EP | 0 013 402 A1 | 7/1980 |

(Continued)

OTHER PUBLICATIONS

Machine Traslation of DE 10 2004 057671.*

*Primary Examiner* — Mike M Dollinger

(74) *Attorney, Agent, or Firm* — Duane Morris LLP; J. Rodman Steele, Jr.; Gregory M. Lefkowitz

(57) ABSTRACT

The present invention relates to modified phenolic resins which contain silicic acid ester units. The modified phenolic resins may, for example, be used as components of a foundry binder system. The invention also relates to a method for producing such modified phenolic resins and to two-component binder systems which contain these modified phenolic resins. The invention furthermore relates to methods for producing foundry molds and foundry cores which contain the modified phenolic resins, and to the foundry molds and foundry cores themselves.

36 Claims, 3 Drawing Sheets

(56) References Cited

U.S. PATENT DOCUMENTS

| | | | |
|---|---|---|---|
| 6,133,403 A * | 10/2000 | Gerber | 528/218 |
| 6,441,106 B1 | 8/2002 | Goda et al. | |
| 7,259,221 B2 | 8/2007 | Durairaj et al. | |
| 2004/0241331 A1 | 12/2004 | Durairaj et al. | |
| 2005/0284087 A1 | 12/2005 | Yang et al. | |
| 2008/0099179 A1 * | 5/2008 | Wang et al. | 164/526 |

FOREIGN PATENT DOCUMENTS

| | | |
|---|---|---|
| EP | 0 423 476 A2 | 4/1991 |
| EP | 1 057 554 A2 | 12/2000 |
| GB | 746 498 | 3/1956 |
| GB | 951 065 | 3/1964 |
| GB | 1 462 366 | 1/1977 |
| JP | 9 216937 A | 8/1997 |

* cited by examiner

MODIFIED PHENOLIC RESINS

CROSS-REFERENCE TO RELATED APPLICATIONS

This application is a continuation of U.S. application Ser. No. 13/140,795, filed Jun. 17, 2011, which is a §371 national stage entry of International Application No. PCT/EP2009/060751, filed Aug. 19, 2009, which claims priority of German Patent Application No. DE 10 2008 055 042.6, filed Dec. 19, 2008, the entire contents of which are incorporated herein by reference.

FIELD OF THE INVENTION

The present invention relates, according to a first aspect, to modified phenolic resins which contain silicic acid ester groups. The modified phenolic resins may, for example, be used as components of foundry binder systems. The invention also relates to a method for producing such modified phenolic resins and to two-component binder systems which contain these modified phenolic resins. The invention furthermore relates to a method for producing foundry molds and foundry cores which contain the modified phenolic resins, and to the foundry molds and foundry cores themselves.

The present invention relates, according to a second aspect, to modified phenolic resins which contain silicic acid ester groups in which 1, 2 or 3 alcohol residues are replaced by substituted or unsubstituted hydrocarbon residues. The modified phenolic resins may, for example, be used as components of foundry binder systems. The invention also relates to a method for producing such modified phenolic resins and to two-component binder systems which contain these modified phenolic resins. The invention furthermore relates to a method for producing foundry molds and foundry cores which contain these modified phenolic resins, and to the foundry molds and foundry cores themselves.

BACKGROUND OF THE INVENTION

Among the modern requirements of foundry binder systems, in particular for the cold-box, polyurethane no-bake and shell molding methods, besides reducing the nasal nuisance and the pollution emission, important features which need to be satisfied are to reduce the condensate formation (permanent mold casting in chimney region), to increase the thermal stability and to reduce the evolution of gases.

Foundry binder systems often contain phenolic resins. Phenolic resins are synthetic resins which are obtained by condensation of phenols and aldehydes and optionally by modifying the resulting condensates. Typical examples of such phenolic resins are novolacs, resols and benzyl ether resins (high-o,o'-resols). The latter are described for example in U.S. Pat. No. 3,495,797, and their use as resin components for foundry binders is described for example in U.S. Pat. No. 3,676,392 and U.S. Pat. No. 3,409,579. A detailed description of benzyl ether resins may be found in DE 10 2004 057 671 B4, paragraph [0004].

Modification of the properties of phenolic resins by reaction with silicon compounds has already been described in some documents.

U.S. Pat. No. 7,259,221 B2 describes the reaction of phenolic plastics with silanes, in particular with alkyltrialkoxysilanes. The use of the modified silanes in rubber mixtures is furthermore described. GB 746,498 describes the reaction of organosilanes with methylolphenol esters. EP 0 013 402 relates to siloxane-modified novolacs, which are produced by reacting novolacs with bifunctional polysiloxanes. US 2005/0284087 describes the reaction of a phenolic resin with an epoxysilane. EP 1 086 972 B1 describes the reaction of condensates of tetraalkyl orthosilicic acid esters with novolacs. U.S. Pat. No. 4,022,753 describes reaction products of polysiloxanes, which contain phenolic hydroxyl groups. GB 951,065 A describes the production of a condensation product starting from phenol-formaldehyde resols and alkoxyarylsilanes or alkoxyarylpolysiloxanes. EP 423 476 A2 describes the reaction of an alkoxysilane with a phenolic resin. JP 09-216937 describes a composition which contains silane-modified phenolic resins. U.S. Pat. No. 6,441,106 B1 describes the production of modified phenolic resins from phenolic resins and tetraalkoxysilanes and alkylalkoxysilanes. EP 0 423 476 A2 describes the production of modified phenolic resins from phenolic resins and monoalkyltrialkoxysilanes. The use of such modified phenolic resins as a binder or a constituent of a binder in order to form foundry molding materials is described neither in U.S. Pat. No. 6,441,106 B1 nor in EP 0 423 476 2. U.S. Pat. No. 3,409,579 describes binders for foundry technology. Alkoxysilanes are described therein as additives which improve the adhesion and are used in an amount of from 0.1 to 2 wt. %.

DETAILED DESCRIPTION

Figure 1:
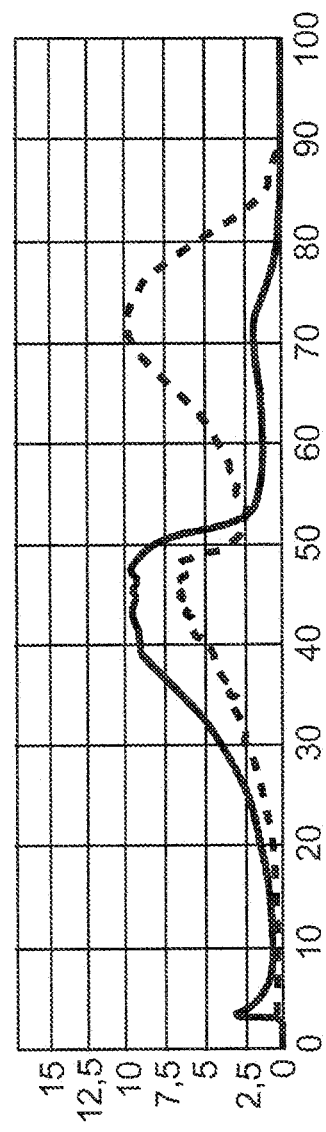
FIG. 1 is a graph of pressure versus time for various resins.

As already described above, the use of conventional phenolic resins in foundry binder systems leads to problems of nasal nuisance, pollution emission, condensate formation, gas evolution and thermal stability. It was the object of the present invention to resolve or at least mitigate some or all of these problems.

This object is achieved, according to a first aspect of the invention, by the use of a modified phenolic resin as a binder or constituent of a binder, in particular for binding foundry molding materials, wherein the modified phenolic resin comprises phenolic resin units which are substituted and/or linked (and are therefore modified) by esters of orthosilicic acid, disilicic acid and/or one or more polysilicic acids and/or the modified phenolic resin can be produced by reacting free hydroxyl groups of a phenolic resin with one or more esters of orthosilicic acid, disilicic acid and/or one or more polysilicic acids. In general, the esters of orthosilicic acid are preferred. Reacting free hydroxyl groups of a phenolic resin with one or more esters of orthosilicic acid, disilicic acid and/or one or more polysilicic acids regularly produces a modified phenolic resin that comprises phenolic resin units which are substituted and/or linked (and are therefore modified) by esters of orthosilicic acid, disilicic acid and/or one or more polysilicic acids. Phenolic resin units which are substituted and/or linked (and are therefore modified) by esters of orthosilicic acid, disilicic acid and/or one or more polysilicic acids in the scope of the present text are ones which contain at least one structural unit of the formula A-Si, wherein A represents a phenolic resin unit. The silicon atom in preferred (but not all) configurations is bonded to further phenolic resin units, in which case the phenolic resin units may additionally be linked to one another in a way which is not represented. The silicon atom may furthermore be connected to one or more groups R—O—, each group R independently of any other group R denoting an organic residue, preferably branched or unbranched $C_1$ to $C_{30}$ alkyl or aryl. The silicon atom may furthermore respectively be connected via an oxygen bridge to further silicon atoms, although this is not preferred in general and in particular when—as discussed below—o,o'-resols are intended to be modified. In the modified phenolic resins according to the invention, individual, a plurality of, the majority or all of the said esters of orthosilicic acid, disilicic acid and/or the polysilicic acids are connected to one, two, three, four or more phenolic resin units of the modified phenolic resin. The use of the modified phenolic resin as a binder or constituent of a binder in the cold-box method, shell molding method or polyurethane no-bake method is preferred according to the invention. The use of the modified phenolic resin as a binder or constituent of a binder in the cold-box method is most preferred; this applies for all configurations of the modified phenolic resin which are explained below.

Likewise preferred is the use according to the invention of a modified phenolic resin wherein it comprises novolac, resol and/or high o,o'-resol units, the use of a modified phenolic resin which comprises high o,o'-resol units being particularly preferred, individual, a plurality of or all of the phenolic resin units being high o,o'-resol units (use of a modified benzyl ether resin).

Also preferred is the use according to the invention of a modified phenolic resin, as described above, which can be produced by reacting free hydroxyl groups of a novolac with one or more esters of orthosilicic acid, disilicic acid and/or one or more polysilicic acids, wherein the novolac has a weight-average Mw of from 200 to 2000. Also preferred is the use according to the invention of a modified phenolic resin, as described above, which can be produced by reacting free hydroxyl groups of a novolac with one or more esters of orthosilicic acid, disilicic acid and/or one or more polysilicic acids, wherein the novolac has an average number of phenol units per molecule of more than 8, preferably 9 or more, particularly preferably 10 or more and more particularly preferably 12 or more.

Likewise preferred is the use according to the invention of a modified phenolic resin, in particular a modified phenolic resin as referred to above as preferred, which comprises phenolic resin units that are linked by esters of orthosilicic acid, modified phenolic resins in which individual, a plurality of or the majority of the orthosilicic acid ester units are linked to exactly two phenolic resin units being particularly preferred. The phenolic resins used in this case thus contain the following structural element:

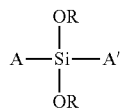

The residues R are independently of one another organic residues as described above; the groups A and A' are independently of one another phenolic resin units which may additionally be linked to one another in a way which is not represented.

The effects of the present invention are based at least in part on the fact that silicon atoms and phenolic resin units are bonded to one another by covalent bonds, and form thermally very stable units. It is therefore preferred that as many as possible of the bonds of the silicon atoms present in the phenolic resins according to the invention are directly connected to phenolic resin units. A use according to the invention is therefore preferred wherein the modified phenolic resin comprises phenolic resin units which are substituted and/or linked (and are therefore modified) by esters of orthosilicic acid, 50%, preferably 80%, particularly preferably 90% and more particularly preferably 98% of the silicon atoms present in the modified phenolic resin being connected to at least one phenolic resin unit. A use according to the invention is therefore furthermore preferred wherein the modified phenolic resin comprises phenolic resin units which are substituted and/or linked (and are therefore modified) by esters of orthosilicic acid and/or wherein the modified phenolic resin can be produced by reacting free hydroxyl groups of a phenolic resin with one or more esters of orthosilicic acid.

In modified phenolic resins which comprise phenolic resin units of disilicic acid and/or one or more polysilicic acids, the silicon atoms contained therein are potentially connected to few phenolic resin units. Their use is therefore less preferred in the scope of the present invention. Also, any other type of condensates, which result from partial hydrolysis and subsequent condensation of esters of orthosilicic acid, disilicic acid and/or one or more polysilicic acids, is less suitable for the present invention. This applies for all embodiments described here, but not without restriction for the use according to the invention in the cold-box method. Then, rather, in particular cases the use according to the invention of a modified phenolic resin, in particular a modified phenolic resin as referred to above as preferred, which comprises phenolic resins that are linked by esters of disilicic acid and/or one or more polysilicic acids, is absolutely preferred.

In phenolic resins in which phenolic OH groups are etherified into alkoxy groups, these phenolic OH groups cannot be bonded to silicon atoms because of the blocking. The according to the invention use of modified phenolic resins which contain etherified OH groups is therefore likewise less preferred. For use of the phenolic resins according to the invention as a binder, and in particular for use as a binder for binding foundry molding materials, it is generally necessary for the phenolic resins according to the invention to have free OH groups and in particular free phenolic OH groups. The use according to the invention of a modified phenolic resin, in particular a modified phenolic resin as referred to above as preferred, is therefore preferred, wherein the modified phenolic resin contains free OH groups, preferably free phenolic OH groups.

Particularly preferred is the use of a modified phenolic resin which can be produced by a method in which free hydroxyl groups of a phenolic resin are reacted with a tetraalkyl ester of orthosilicic acid, preferably the tetraethyl ester of orthosilicic acid, so that the modified phenolic resin is obtained.

Also particularly preferred is the use of a modified phenolic resin, which can be produced by a method in which free hydroxyl groups of a novolac, a resol or a high o,o'-resol, preferably a high o,o'-resol, are reacted with a tetraalkyl ester of orthosilicic acid, preferably the tetraethyl ester of orthosilicic acid, so that the modified phenolic resin is obtained, as a binder or constituent of a binder, in particular for binding foundry molding materials.

Most preferred is the use of a modified phenolic resin wherein the modified phenolic resin can be produced by a method in which free hydroxyl groups of a phenol-formaldehyde novolac, a phenol-o-cresol-formaldehyde novolac and/or a phenol-formaldehyde high-o,o'-resol are reacted with a tetraalkyl ester of orthosilicic acid, preferably the tetraethyl ester of orthosilicic acid, so that the modified phenolic resin is obtained.

In domestic studies, it was found that the use of phenolic resins that contain silicon in a form which leads to the formation of $SiO_2$ residues by pyrolysis, as a binder or in other applications, leads to advantageous properties without other desired properties, in particular the strength of the molded bodies thereby produced, being compromised, or being significantly compromised. In particular, when they are used for binding foundry molding materials, nasal nuisance, pollution emission, condensate formation and/or gas evolution are reduced and the thermal stability is often increased. It is in this case preferred for the majority of the silicon atoms to be connected to the rest of the phenolic resin by at least one covalent bond. Similar considerations apply for other applications.

The use according to the invention (as described above) of a modified phenolic resin is likewise preferred wherein, when heated in air to 1000° C. in a muffle furnace to constant mass, the modified phenolic resin gives an $SiO_2$ residue of from 1 percent by weight to 30 percent by weight, preferably from 2 percent by weight to 30 percent by weight, particularly preferably from 3 percent by weight to 30 percent by weight, more particularly preferably from 5 percent by weight to 25 percent by weight and most preferably from 7 percent by weight to 20 percent by weight, expressed in terms of the weight of the mass of modified phenolic resin used.

The use according to the invention (as described above) of a modified phenolic resin is also preferred wherein the modified phenolic resin can be produced by reacting free hydroxyl groups of a phenolic resin with one or more esters of orthosilicic acid, disilicic acid and/or one or more polysilicic acids in the presence of water or diols, in particular $C_1$-$C_6$ diols, for example selected from the group consisting of ethylene glycol, 1,2-propanediol, 1,3-propanediol, 1,2-butanediol, 1,3-butanediol and 1,4-butanediol. In some embodiments, the addition of water and/or diols surprisingly increases the proportion of silicon in the modified phenolic resin. Under certain reaction conditions, however, the presence of water in the reaction mixture can lead to condensation of the esters of orthosilicic acid, disilicic acid and/or one or more polysilicic acids, which is undesirable. The person skilled in the art will therefore adjust the reaction conditions by preliminary tests so that condensation is prevented or takes place only to a small extent.

Another subject matter of the invention relates to new modified phenolic resins comprising phenolic resin units which are substituted and/or linked (and therefore modified) by esters of orthosilicic acid, and/or which can be produced by reacting free hydroxyl groups of a phenolic resin (basic resin) with one or more esters of orthosilicic acid. The modified phenolic resins according to the invention are suitable in particular for the use according to the invention.

Preferred are new modified phenolic resins, comprising phenolic resin units, which can be produced by reacting free hydroxyl groups of a phenolic resin (basic resin) with one or more esters of orthosilicic acid, wherein the phenolic resin (basic resin) has an average number of phenol units per molecule of more than 8, preferably 9 or more, particularly preferably 10 or more and more particularly preferably 12 or more. Reacting free hydroxyl groups of a phenolic resin with one or more esters of orthosilicic acid regularly produces a modified phenolic resin that comprises phenolic resin units which are substituted and/or linked (and are therefore modified) by esters of orthosilicic acid. As described above, the use of condensates of orthosilicic acid is less preferred. These new, modified phenolic resins are preferably used in the way according to the invention. A modified phenolic resin according to the invention, in which the phenolic resin units are novolac, resol and/or high o,o'-resol units, is in this case preferred. Particularly preferred is a phenolic resin modified according to the invention comprising high o,o'-resol units, wherein individual, a plurality of or all of the phenolic resin units are high o,o'-resol units.

A modified phenolic resin according to the invention, in particular a modified phenolic resin as referred to above as preferred, is preferred wherein the modified phenolic resin contains free OH groups, preferably free phenolic OH groups.

Also preferred is a phenolic resin modified according to the invention, preferably a modified phenolic resin as referred to above as preferred, comprising phenolic resin units which are linked by esters of orthosilicic acid, wherein individual or a plurality of esters of orthosilicic acid are linked to exactly two phenolic resin units.

Particularly preferred is a phenolic resin modified according to the invention which can be produced by a method in which free hydroxyl groups of a phenolic resin are reacted with a tetraalkyl ester of orthosilicic acid, preferably the tetraethyl ester of orthosilicic acid, so that the modified phenolic resin is obtained.

Particularly preferred in this case is a phenolic resin modified according to the invention (preferably referred to above as preferred) which can be produced by a method in which free hydroxyl groups of a novolac, a resol or a high o,o'-resol, preferably a high o,o'-resol, are reacted with a tetraalkyl ester of orthosilicic acid, preferably the tetraethyl ester of orthosilicic acid, so that the modified phenolic resin is obtained.

Most preferred is a phenolic resin modified according to the invention (preferably referred to above as preferred) which can be produced by a method in which free hydroxyl groups of a phenol-formaldehyde novolac, a phenol-o-cresol-formaldehyde novolac and/or a phenol-formaldehyde high-o,o'-resol are reacted with a tetraalkyl ester of orthosilicic acid, preferably the tetraethyl ester of orthosilicic acid, so that the modified phenolic resin is obtained.

Also preferred is a modified phenolic resin, as described above, which can be produced by reacting free hydroxyl groups of a novolac with one or more esters of orthosilicic acid, disilicic acid and/or one or more polysilicic acids, wherein the novolac has a weight-average Mw of from 200 to 2000. Also preferred is a modified phenolic resin, as described above, which can be produced by reacting free hydroxyl groups of a novolac with one or more esters of orthosilicic acid, disilicic acid and/or one or more polysilicic acids, wherein the novolac has an average number of phenol units per molecule of more than 8, preferably 9 or more, particularly preferably 10 or more and more particularly preferably 12 or more.

In particular, a modified phenolic resin according to the invention (preferably referred to above as preferred) having a pH in the range of 6.0-7.0 is also preferred. In order to determine the pH of the phenolic resin, the following procedure is adopted: 1.) 10 parts by weight of resin are added to 90 parts by weight of double-distilled (virtually ion-free) water and stirred for about 1 hour. 2.) After stirring, the resin layer is allowed to settle for about 30 minutes and the aqueous phase is poured off 3. The pH of the aqueous phase is measured.

The modified phenolic resins defined above are distinguished by high thermal stability.

Another subject matter of the present invention relates to a two-component binder system, consisting of a phenolic resin component and a polyisocyanate component, wherein the polyisocyanate component comprises a polyisocyanate having at least two isocyanate groups per molecule and the phenolic resin component comprises one of the modified phenolic resins according to the invention as described above. The phenolic resin component preferably comprises one of the new modified phenolic resins as described above.

It has surprisingly been found that phenolic resins, in particular phenol-formaldehyde novolacs, phenol-o-cresol-formaldehyde novolacs and benzyl ether resins (high-o,o'-resols) (which are typical resins for application as a basic resin in the cold-box method) can be reacted with esters of orthosilicic acid, in particular tetraethyl silicate, to form modified phenolic resins having outstanding, unexpected properties.

Modified phenolic resins according to the invention, which contain etherified OH groups are less preferred. Modified phenolic resins which contain no etherified phenolic OH groups, in particular no phenolic OH groups etherified with alkyl residues, are therefore preferred in particular.

Another subject matter according to the first aspect of the invention therefore relates to a method for producing a modified phenolic resin, comprising the following step:

reacting a phenolic resin (basic resin) with at least one ester of orthosilicic acid so as to obtain a modified phenolic resin in which phenolic resin units are substituted or linked by esters of orthosilicic acid.

A method according to the invention is preferred, wherein the phenolic resin (basic resin) has an average number of phenol units per molecule of more than 8, preferably 9 or more, particularly preferably 10 or more and more particularly preferably 12 or more. A method according to the invention for producing a modified phenolic resin comprising the following step is particularly preferred:

reacting a phenolic resin with at least one ester of orthosilicic acid so as to obtain a modified phenolic resin in which phenolic resin units are substituted or linked by esters of orthosilicic acid, wherein the phenolic resin (basic resin) has an average number of phenol units per molecule of more than 8, preferably 9 or more, particularly preferably 10 or more and more particularly preferably 12 or more.

The transesterification of the silicic acid ester with the phenolic resin may be carried out by using a conventional catalyst. For example, Brønsted acids, Brønsted bases, Lewis acids, Lewis bases or metal oxides are suitable. Examples of suitable Brønsted acids are for example acetic acid, sulfonic acids, in particular para-toluenesulfonic acid, benzoic acid, propionic acid and other organic acids. Brønsted acids having a $pK_a$ value of less than or equal to 1 are particularly preferred. For example, alcoholates (for example sodium methylate) or amines are suitable as Brønsted bases. Example of suitable Lewis acids are metal ions of the metals zinc, aluminum, titanium, cobalt, germanium, tin, lead, antimony, arsenic, cerium, boron, cadmium and manganese. The metal ions mentioned above may be present for example in the form of salts of organic acids, halides or alkoxides. Examples of suitable oxides are the oxides of the aforementioned metals. Organic acids, dibutyltin dilaurate, tin(II) 2-ethylhexanoate are particularly preferred.

The conduct of the reaction of the phenolic resin with the ester of orthosilicic acid is preferably carried out so that the phenolic OH groups of the phenolic resin are not etherified, in particular not by alcohol resulting from the transesterification of the ester of orthosilicic acid. The reaction conditions suitable for this will be indicated below, particularly in the examples. The person skilled in the art will optionally determine suitable reaction conditions by preliminary tests.

The conduct of the reaction of the phenolic resin with the ester of orthosilicic acid is preferably also carried out so that the OH groups and in particular the phenolic OH groups of the phenolic resin are not fully reacted. A method according to the invention for producing a modified phenolic resin, in particular a modified phenol resin as referred to above as preferred, is therefore preferred, wherein the ratio of the free OH groups of the phenolic resin used to the orthosilicic acid esters used is such that the resulting modified phenolic resin has free OH groups, preferably free phenolic OH groups.

A method according to the invention for producing a modified phenolic resin comprising the following step is preferred: reacting a phenolic resin with at least one ester of orthosilicic acid so as to obtain a modified phenolic resin in which phenolic resin units are substituted or linked by esters of orthosilicic acid, wherein the reaction is carried out in the absence of polar aprotic solvents, in particular dimethylformamide, preferably without the addition of any solvent.

When reacting the tetraethyl ester of orthosilicic acid (tetraethyl silicate; TES) with a novolac, for example a transesterification reaction of the tetraethyl ester of orthosilicic acid with the phenolic OH group takes place, with ethanol being formed. The resulting ethanol is preferably distilled off in situ. The reaction equilibrium is thereby shifted to the side of the silylated resin.

By a double, triple or quadruple substitution of the ethoxy groups on the silicon atom, that is to say by crosslinking, the chain length or, resp., the molecular weight of the resin increases significantly. Thus, in domestic studies, novolacs were obtained whose weight-average increased from $M_w=600$ to $M_w>10,000$. Surprisingly, TES preferentially reacts bifunctionally in relation to phenols under acidic conditions, so that two of the four ethoxy groups can be substituted almost stoichiometrically. This can be determined by the mass balance of ethanol and TES. By short reaction times and a high TES excess, however, the reaction can also be controlled so that predominantly only one ethoxy group of the TES is substituted. The weight-average of the phenolic resin then changes only to a small extent. Similar considerations apply for other esters of silicic acid.

Surprisingly, however, the modified phenolic resins with a high molar mass produced according to the invention can also dissolve well in esters of orthosilicic acid, disilicic acid and polysilicic acids, particularly in TES. Conventional phenolic resins, on the other hand, can only be diluted to a limited extent with TES. In practice, cosolvents besides TES are therefore used for phenolic resins in order to achieve a satisfactory viscosity. With very high molar masses, the addition of cosolvents may also be advantageous or necessary for the modified phenolic resins produced according to the invention.

The present invention therefore also relates to a solution comprising
    a modified phenolic resin according to the invention, as described above or below, and
    a solvent selected from the group consisting of esters of orthosilicic acid, disilicic acid and polysilicic acids.

Tetraethyl silicate (TES) and partially condensed silicic acid esters having an $SiO_2$ component of up to 40 wt. % are particularly preferred as a solvent or as a solvent constituent. The $SiO_2$ component is in this case. The use of such solutions to produce binders for binding foundry molding substances often leads to further reduction of nasal nuisance, pollution emission, condensate formation, gas evolution and thermal stability in the casting process, compared with use of the modified phenolic resins according to the invention without the aforementioned solvents.

The acid used as a catalyst is preferably neutralized. In the event of not carrying out neutralization and dilution with TES (see above and below), further reaction of free OH groups of the resin with TES often occurs both for novolacs and for benzyl ether resins and resols. This further reduces the number of OH groups in the resin, so that in particular cases too few OH groups would be available for further use as a binder, particularly for a reaction with isocyanates (see below). Furthermore, ethanol is formed during the reaction with TES, which is likewise undesirable since it likewise reacts with isocyanates in the application and therefore counteracts the molecular growth or binder stability.

In the case of benzyl ether resins and resols, polycondensation of the basic resin, which is unstable with respect to acids, also takes place in the presence of a non-neutralized acid.

During distillation to remove the alcohol, crosslinking of the phenolic resin units would also take place, which leads to gelling (three-dimensional crosslinking; insoluble in all solvents, merely swellable) and finally to the resite state (three-dimensionally crosslinked thermoset) of the resin. Without neutralization after the reaction of resols or benzyl ether resins with TES, it is moreover difficult to distil off the resulting alcohol fully since the presence of acid, particularly with an increasing distillation temperature, leads increasingly to polycondensation and therefore finally to gelling of the resin. Even without a distillation process, a non-neutralized product (of benzyl ether resin or resol with TES) is not storage-stable, i.e. the product is converted into the resite state after only a few days.

Brønsted and Lewis bases, in particular amines, are suitable as neutralizing agents. The molar mass of the product depends on the time at which the neutralizing agent is added. In order to avoid a local overconcentration and concomitant impairment of the product, amines preferably pre-diluted in ethanol or TES are used as neutralizing agents. The modified phenolic resins according to the invention may therefore comprise reaction products of catalyst and neutralizing agent embedded in the phenolic resin matrix, in particular salts of the acids used for catalysis during production. The neutralized modified phenolic resins according to the invention preferably have a pH in the range of 6.0-7.0. Without neutralization, the aqueous phase generally has a pH of <4 (pH~3).

The production of a modified phenolic resin to be used according to the invention preferably takes place in the following steps (the reference below to TES is to be understood as an example; other esters of silicic acids are also used similarly):

a. Production of the phenolic resin, as an addition and condensation product of phenols (pure form or mixture of phenol, cresol, xylenol, etc.) and aldehydes (usually formaldehyde). Distinction is made between novolacs (acid-catalyzed, F/P is less than 1), resols (alkali-catalyzed, F/P is in the range of from 1 to 3) and high o,o'-resols (catalyzed with divalent metal ions in weak acid, usually catalyzed with $Zn^{2+}$, F/P is in the range of from 1 to 2; also referred to as benzyl ether resins), wherein F/P indicates the molar ratio of the aldehyde to the phenol.

i. novolacs are therefore produced by acid catalysis and with a formaldehyde deficit (F/P<1, preferably F/P<0.9; particularly preferably F/P<0.75). The resin is built up by means of methylene bridges. Before reaction with TES, water of reaction and phenol are conventionally distilled off In the scope of the present invention, novolacs with a weight-average Mw of from 200 to 2000 are preferably used, preferably novolacs which have an average number of phenol units per molecule of more than 8, preferably 9 or more, particularly preferably 10 or more and more particularly preferably 12 or more.

ii. resols are produced by alkali catalysis and with a formaldehyde excess (F/P 1 to 3). The resin is built up by means of methylene bridges and contains many terminal methylol groups. It is self-curing by heat and the effect of acid. The water cannot therefore readily be distilled off. It has to be separated by elaborate processes. The production of water-free resols by azeotropic distillation is described, for example, in the patent specification GB 951,065.

iii. high o,o'-resols are produced by catalysis with divalent metal ions (usually $Zn^{2-}$) in weak acid with an aldehyde excess (F/P of from 1 to 2). The resin is built up by means of methylene and dibenzyl ether bridges, which are predominantly located in the ortho position of the phenol units. The resin is unstable with respect to the effect of heat and acid. The water of reaction and some of the phenol monomer are conventionally distilled off before reaction with TES.

b. crosslinking the basic resin with a defined amount of tetraethyl silicate (TES)

c. optionally crosslinking the mixture obtained after step b. with a defined amount of a solvent (e.g. ethanol)

d. adding a defined amount of a catalyst, preferably a Brønsted acid (preferably para-toluenesulfonic acid, PTS)

e. holding the reaction mixture at a particular temperature for a defined time;

f. optionally neutralization (neutralization is often necessary when reacting high o,o'-resols, cf. above, as well as below)

g. distilling off the resulting ethanol (to which end heating and/or reducing pressure)

h. optionally neutralization (particularly in the case of subsequent dilution with an TES)

i. optionally final dilution of the product thus obtained with TES

Depending on the resin type and the application, the person skilled in the art will select a suitable procedure in order to obtain a resin having the desired properties. Specific examples are given below as Examples 1 to 4. A general overview will first be given below, relating to the production of silylated phenolic resins based on novolacs and high o,o' resols. All the information is given by way of example, and differences in particular cases are possible:

TABLE 1

| | Novolac | Resol | High o,o'-Resol |
|---|---|---|---|
| a) Production of the basic resin | | | |
| Formaldehyde: Phenol | <1.0 | >1.0 | >1.0 |
| Catalyst | acid; preferably oxalic acid, neutralize acid before reaction with TES. In the case of oxalic acid, breakdown | bases, preferably sodium hydroxide solution | divalent metal ions, in particular $Zn^{2+}$ |

TABLE 1-continued

| | Novolac | Resol | High o,o'-Resol |
|---|---|---|---|
| Resin structure | at temperatures >160° C. also possible. methylene bridges | methylene bridges, terminal methylol groups | methylene and methylene ether bridges, methylol groups at end |
| Weight-average Mw (residues of monomeric phenol in the resin also included in the determination of the average molar mass.) | 200-5000 (preferably 200-2000, typically: 200-1000) control by means of P/F ratio and functionality of the monomers | 140-3000 preferably: 140-600 control primarily by means of the condensation time and condensation temperature | 500-5000 (typically: 500-1000) control primarily by means of the condensation time |
| Property | thermoplastic residual monomeric phenol <1.0% | heat- and acid-curing | heat- and acid-curing monomeric phenol ~8% |
| | | Reaction with TES | |
| in particular tests with | o-cresol-phenol novolac, Mw = 600 | phenol-formaldehyde resol; o-cresol-formaldehyde resol P/F = 1:1 | phenol-formaldehyde high-o,o'-resol P/F = 1:1.3; Mw = 800 |
| b) ratio of Resin:TES (mass/mass) in the examples | 2 to 1; 4 to 1: good results in the cold-box method | 1 to 1 | 4 to 1; 2 to 1 or 1 to 1 optionally ethanol as solvent; good results in the cold-box method |
| c) Catalyst | PTS | PTS | PTS |
| d) Temperature | about 130° C. resin is not temperature-sensitive. | about 80° C. basic resin is temperature-sensitive. | about 90° C. basic resin is temperature-sensitive. |
| d) Holding phase (necessary when neutralization 1 is intended to be carried out) | optional. slow molecular growth. | Necessary holding time generally <60 minutes: basic resin condenses further by the effect of acid and is susceptible to gelling. | Necessary silylation reaction takes place very rapidly: 50% TES broken down in <2 minutes. holding time generally <60 minutes: basic resin condenses further by the effect of acid and is susceptible to gelling. good results in the cold-box method with holding time 30 minutes. |
| e) Neutralization 1 | optional. | Important since otherwise the basic resin reacts further owing to the acid and gels during the distillation. | Important since otherwise the basic resin reacts further owing to the acid and gels during the distillation. |
| f) Distillation of the ethanol | Reduction of the pressure to about 70 mbar. Increase of the temperature possible. | | Reduction of the pressure to about 70 mbar. Temperature preferably kept at 90° C. |
| g) Neutralization 2 | Necessary, if subsequently diluting with TES | Bases, preferably sodium hydroxide solution | Already done in e). |

A method according to the invention (for producing a modified phenolic resin for the use according to the invention) is preferred, wherein the phenolic resin (basic resin) is a novolac, a resol or a high o,o'-resol. A method for producing a modified phenolic resin comprising the following step is preferred: reacting a phenolic resin with at least one ester of orthosilicic acid so as to obtain a modified phenolic resin in which phenolic resin units are substituted or linked by esters of orthosilicic acid, wherein the reaction is carried out in the absence of polar aprotic solvents, in particular dimethylformamide, preferably without the addition of any solvent.

A method according to the invention (for producing a modified phenolic resin for the use according to the invention) is particularly preferred, wherein the phenolic resin (basic resin) is a novolac, and wherein the novolac has a weight-average Mw of from 200 to 2000. A method according to the invention is also preferred, wherein the phenolic resin (basic resin) is a novolac, and wherein the novolac has an average number of phenol units per molecule of more than 8, preferably 9 or more, particularly preferably 10 or more and more particularly preferably 12 or more. When using a novolac as the basic resin, a method comprising the following steps is more particularly preferred:

i. preparing a reaction mixture comprising or consisting of a novolac (preferably having a weight-average Mw of from 200 to 2000, particularly preferably using a novolac which has an average number of phenol units per molecule of more than 8, preferably 9 or more, particularly preferably 10 or more and more particularly preferably 12 or more), at least one tetraalkyl ester of orthosilicic acid (preferably TES) and a Brønsted acid having a $pK_a \leq 5$, preferably having a $pK_a \leq 3$ and particularly preferably having a $pK_a \leq 1$, wherein the ratio of the amount of silicon to the weight of basic resin used lies in the range of from 0.5 to 20.0 mol of Si per kg of basic resin, preferably in the range of from 1 to 5 mol of Si per kg of basic resin, ii. reacting the prepared reaction mixture at a temperature in the range of from 20 to 200° C., preferably 20-150° C., and distilling off the resulting alcohol (when using TES, this is ethanol) from the reaction mixture, iii. optionally neutralizing or partially neutralizing the reaction mixture after removal of the alcohol.

Correspondingly, when using a high o,o'-resol as the basic resin, a method according to the invention comprising the following steps is particularly preferred:

i. preparing a reaction mixture comprising or consisting of a high o,o'-resol, at least one tetraalkyl ester of orthosilicic acid and a Brønsted acid having a $pK_a \leq 5$, preferably having a $pK_a \leq 3$ and particularly preferably having a $pK_a \leq 1$, wherein the ratio of the amount of silicon to the weight of basic resin used lies in the range of from 0.5 to 20.0 mol of Si per kg of basic resin, preferably in the range of from 1 to 5 mol of Si per kg of basic resin, ii. reacting the mixture at a temperature in the range of from 20 to 150° C., preferably from 20 to 120° C., particularly preferably from 20 to 100° C. and more particularly preferably 60 to 95° C., with a reaction time in the range of from 1 minute to 20 hours, preferably in the range of from 1 minute to 2 hours and particularly preferably in the range of from 15 minutes to 45 minutes, iii. neutralizing the reaction mixture reacted according to step ii, iv. distilling off the alcohol formed during the reaction according to step ii and optionally a solvent from the neutralized reaction mixture at reduced pressure.

The choice of the reaction time in step ii depends on the temperature, the catalyst and the desired conversion ratio. With higher temperatures and long reaction times, the polycondensation of the basic resin increases to an extent that is no longer acceptable, so that it leads to gelling of the benzyl ether resin or the resol and finally to resite formation. Water resulting from the polycondensation in parallel increases the polysiloxane formation to an undesired extent. If the reaction mixture is not neutralized, the resite formation takes place after a few days even at room temperature. The person skilled in the art will therefore select suitable reaction conditions, which he optionally determines by preliminary tests.

A method according to the invention (preferably according to one of the alternatives disclosed above) is likewise preferred, wherein the phenolic resin is selected from the group consisting of phenol-formaldehyde novolac, phenol-o-cresol-formaldehyde novolac and phenol-formaldehyde high-o,o'-resol.

In the method as described above according to the first aspect of the invention (for producing a modified phenolic resin for the use according to the invention), the person skilled in the art will advantageously lengthen the reaction time with a decreasing acid strength of the Brønsted acid used, and vice versa.

A method according to the invention for producing modified phenolic resins, as described above, is particularly preferred, wherein the reaction of the phenolic resin, in particular the reaction of benzyl ether resins and resols with an ester of orthosilicic acid, disilicic acid and/or one or more polysilicic acids (for example TES) is carried out at a temperature of 60° C. or less. This minimizes the formation of ethyl ethers in the resin and increases the proportion of silicon in the modified phenolic resin. This is advantageous particularly for benzyl ether resins and resols, since they have methylol groups which can be etherified and which are unstable with respect to acid and heat. In particular at low temperatures of about 60° C. and lower, the polycondensation reaction only takes place to a comparatively minor extent even in the presence of non-neutralized acid, so that the molar mass increase only takes place very slowly owing to the low polycondensation of the basic resin. Even in the case of benzyl ether resins and resols, therefore, part of the ethanol can be removed by applying a vacuum and the number of silicon atoms bonded to the phenolic resin units can be increased by shifting the reaction equilibrium.

As described above, the addition of water or diols during production of the modified phenolic resins according to the invention can lead to an increase in the proportion of silicon in the modified phenolic resin, which in general is desirable. In some embodiments, however, water in a sizeable amount can also interfere with the reaction, since it can hydrolyze esters of silicic acid. The products of the hydrolysis can then condense further to form polysiloxanes or other compounds, which under certain circumstances can precipitate from the reaction mixture. The condensates moreover have fewer binding sites which can react with phenolic resin units, and are therefore less preferred. The use of resols in the scope of this invention is therefore in general less suitable, since resols usually have a high water content. In domestic studies, however, it was observed that at least with amounts of water <1 mol of water per mol of TES, no precipitation takes place, in particular no precipitation of polysiloxanes. It is therefore preferred, particularly when using resols, to use low-water or water-free phenolic resins. The production of low-water or water-free resols is described, for example, in the patent specification GB 951,065. The person skilled in the art will establish by simple preliminary tests the suitable or maximum water content for the phenolic resins, in particular the resols.

It has surprisingly been found that for core production using the cold-box method with modified phenolic resins to be used according to the invention, it is possible to use a resin/polyisocyanate mixture having a significant resin excess with (compared with commercially available two-component binder systems based on phenolic resin and polyisocyanate) the same total binder amount. In preferred embodiments, pure MDI can in this case be used as a polyisocyanate component.

Another subject matter according to the first aspect of the present invention therefore relates to a method for producing a hardened foundry mold or a hardened foundry core according to the cold-box method, comprising the following steps:

i. producing a mixture comprising or consisting of a modified phenolic resin to be used according to the invention, a polyisocyanate (for example a diisocyanate) and a molding material,
ii. molding the mixture to form a foundry mold or a foundry core and
iii. hardening the molded mixture, optionally by using a catalyst.

Here, a method is particularly preferred, wherein the modified phenolic resin and/or the polyisocyanate are or is dissolved in a solvent, preferably the tetraethyl ester of orthosilicic acid, before producing the mixture (i.e. before step i)). At least a part of the total amount of tetraethyl ester of orthosilicic acid subsequently present has preferably already been used during production of the modified phenolic resin; this part may be present as so-called residual monomer in the modified phenolic resin, which is intended to be dissolved.

Another preferred embodiment is in this case a method in which a catalyst is used in step iii, wherein the catalyst may be an amine, preferably triethylamine, dimethylethylamine or dimethylisopropylamine, which is preferably used in the form of gas.

In the aforementioned method for producing a hardened foundry mold or a hardened foundry core, the flowability of the mixture comprising or consisting of a modified phenolic resin as defined above (preferably one of the new modified phenolic resins), a polyisocyanate and a molding material is very good, which leads to a better compactability of the mixture. This is advantageous when molding the mixture to form the foundry mold or the foundry core.

In the aforementioned method for producing a hardened foundry mold or a hardened foundry core, the use of a modified phenolic resin is particularly preferred, wherein individual, a plurality of or all of the phenolic resin units linked to one another are high o,o'-resol units, since when using such modified phenolic resins according to the invention as a binder for sand, the sand mixtures produced therefrom are distinguished by an extended sand lifetime compared with conventional sand mixtures.

An associated subject matter according to the first aspect of the present invention therefore relates to a hardened foundry mold or a hardened foundry core, comprising a molding material and a hardened binder (according to the invention), the binder comprising phenolic resin units which are substituted and/or linked by esters of orthosilicic acid, disilicic acid and/or one or more polysilicic acids. In respect of preferred configurations of the binder and the method for its production, the statements above apply accordingly.

Hardened foundry molds and hardened foundry cores according to the invention generally have similar strength profiles to hardened foundry molds or hardened foundry cores which have been produced by using conventional binders.

Gas evolution studies with the aid of gas pressure measurements show that the hardened foundry molds and hardened foundry cores according to the invention have a different gas evolution characteristic than foundry molds and cores according to the prior art (see technical application Example 2). In contrast to conventional systems, which conventionally exhibit two gas pressure maxima after 30 to 50 seconds and 60 to 80 seconds following immersion in liquid aluminum, the foundry molds and foundry cores according to the invention in domestic studies only have a maximum after an elapsed time of from 30 to 55 seconds. Furthermore, the total amount of gas released is much less than in conventional systems.

The high gas pressures and gas pressure variations of conventional systems often lead to gas defects. Castings which are affected by gas defects, when they are produced using conventional hardened foundry molds and hardened foundry cores, can therefore often be manufactured without gas defects when employing binders to be used according to the invention.

These findings are confirmed by studies with the aid of thermogravimetric analysis (TGA), in which the foundry molds and foundry cores according to the invention do not have a significant extremum in the graph of mass loss per unit time until higher temperatures than the conventional systems (see technical application Example 3). Furthermore, a second pronounced extremum does not occur in this graph, as is the case with conventional systems. The total mass loss in the case of the conventional systems is about 69%, while the systems according to the invention have a total mass loss of only about 61%. Comparatively, this means that 26% more residue remains in foundry molds and cores according to the invention compared with conventional systems. It follows from this that the total gas emission is significantly reduced.

A technical application test with a bending bar in the shell molding method furthermore shows that the hardened foundry molds and foundry cores according to the invention have a similar bending strength level compared with foundry molds and cores according to the prior art (see technical application Example 4). The odor during production of the foundry mold and foundry cores is significantly reduced compared with standard systems.

The present invention therefore—as mentioned—relates in particular to the use of a modified phenolic resin as
- a binder or a constituent of a binder, in particular for binding foundry molding materials, and furthermore use as
- a binder for insulating materials, in particular as a binder for glass fiber insulating materials,
- a molding material or a constituent of a molding material, in particular as an industrial resin, for example as a grinding disk resin and/or as a composite material,
- an insulator or a constituent of an insulator, in particular as an electrical insulator or as a constituent thereof, and preferably as a base material for the production of printed circuit boards (circuit cards), as insulation of printed circuit boards or as insulation of semiconductor elements or other components which are employed in the semiconductor industry, or as
- a coating material or a constituent of a coating material, wherein the modified phenolic resin comprises phenolic resin units which are substituted and/or linked by esters of orthosilicic acid, disilicic acid and/or one or more polysilicic acids. In each case, the statements above apply accordingly.

According to a second aspect of the present invention, the objects stated above are achieved according to the invention by the use of a modified phenolic resin as a binder or a constituent of a binder, in particular for binding foundry molding materials, wherein the modified phenolic resin comprises phenolic resin units which are substituted and/or linked (and are therefore modified) by esters of orthosilicic acid in which 1, 2 or 3 alcohol residues are replaced by substituted or unsubstituted hydrocarbon residues, and/or wherein the modified phenolic resin can be produced by reacting free hydroxyl groups of a phenolic resin with one or more esters of orthosilicic acid in which 1, 2 or 3 alcohol residues are replaced by substituted or unsubstituted hydrocarbon residues.

In the scope of the present invention, esters of orthosilicic acid in which 1, 2 or 3 alcohol residues are replaced by substituted or unsubstituted hydrocarbon residues (also referred to below as "modified esters"), are compounds of the formula $R^1{}_n\mathrm{Si}(\mathrm{OR})_{4-n}$, in which n=1, 2 or 3, each group R independently of any other group R denoting an organic residue, preferably branched or unbranched $C_1$ to $C_{30}$ alkyl or aryl, as correspondingly defined in connection with the first aspect. $R^1$ is in this case a substituted or unsubstituted, branched or unbranched hydrocarbon residue and the residues $R^1$ in the case of n=2 or 3 are identical or different. The residues $R^1$ are preferably substituted or unsubstituted, branched or unbranched $C_1$ to $C_{30}$ alkyl or substituted or unsubstituted aryl, and particularly preferably substituted or unsubstituted, branched or unbranched $C_1$ to $C_6$ alkyl or substituted or unsubstituted $C_6$ to $C_{10}$ aryl. Unsubstituted, branched or unbranched $C_1$ to $C_6$ alkyl or unsubstituted phenyl is most preferred. Methyl and ethyl are in turn particularly preferred among these. The hydrocarbon residues may for example be substituted by groups selected from the group consisting of hydroxyl groups, alkoxy groups, amino groups, which are additionally optionally substituted by one or two alkyl or aryl groups, or trialkylammonium groups, mercapto groups, vinyl groups, 3-glycidoxy groups and epoxy groups, the alkyl groups preferably being $C_1$ to $C_6$ alkyl groups.

Particularly preferred are modified esters selected from the group consisting of monoalkyltrialkoxysilanes, dialkyldialkoxysilanes, trialkylmonoalkoxysilanes, monoaryltrialkoxysilanes, diaryldialkoxysilanes and triarylmonoalkoxysilanes, the alkyl groups preferably being $C_1$ to $C_6$ alkyl groups. Preferred are modified esters selected from the group consisting of methyltrimethoxysilane, methyltriethoxysilane, methyltripropoxysilane, methyltributoxysilane, ethyltrimethoxysilane, methyltriethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxipropyltrimethoxysilane, 3-glycidoxypropyltriethoxysilane, 3-mercaptopropyltrimethoxysilane, 3,4-epoxycyclohexyltrimethoxysilane, gamma-aminopropyltriethoxysilane, dimethoxydimethylsilane, diethoxydimethylsilane, diethyldimethoxysilane and diethyldiethoxysilane.

Reacting free hydroxyl groups of a phenolic resin with one or more esters of orthosilicic acid, in which 1, 2 or 3 alcohol residues are replaced by substituted or unsubstituted hydrocarbon residues, regularly produces a modified phenolic resin that comprises phenolic resin units which are substituted and/or linked (and are therefore modified) by esters of orthosilicic acid in which 1, 2 or 3 alcohol residues are replaced by substituted or unsubstituted hydrocarbon residues. Phenolic resin units which are substituted and/or linked (and are therefore modified) by esters of orthosilicic acid, in which 1, 2 or 3 alcohol residues are replaced by substituted or unsubstituted hydrocarbon residues, in the scope of the present text are ones which contain at least one structural unit of the formula A-Si, wherein A represents a phenolic resin unit. The silicon atom in preferred (but not all) configurations is bonded to further phenolic resin units, wherein the phenolic resin units may additionally be linked to one another in a way which is not represented. The silicon atom is, however, according to the second aspect of the present invention, bonded to 1, 2 or 3 substituted or unsubstituted hydrocarbon residues $R^1$, each $R^1$ independently of any other groups $R^1$ being defined as described above. The silicon atom may furthermore be bonded to one or more groups R—O—, each group R independently of any other group R being as defined above. The silicon atom may furthermore respectively be connected via an oxygen bridge to further silicon atoms. In the modified phenolic resins according to the invention, individual, a plurality of, the majority or all said esters of orthosilicic acid, in which 1, 2 or 3 alcohol residues are replaced by substituted or unsubstituted hydrocarbon residues, are connected to one, two or three, phenolic resin units of the modified phenolic resin.

The use of the modified phenolic resin as a binder or constituent of a binder in the cold-box method, shell molding method or polyurethane no-bake method is preferred according to the invention. The use of the modified phenolic resin as a binder or constituent of a binder in the cold-box method is most preferred; this applies for all configurations of the modified phenolic resin which are explained below.

The use according to the invention of a modified phenolic resin is likewise preferred, wherein it comprises novolac, resol and/or high o,o'-resol units, the use of a modified phenolic resin which comprises high o,o'-resol units being particularly preferred, individual, a plurality of or all of the phenolic resin units being high o,o'-resol units (use of a modified benzyl ether resin).

Also preferred is the use according to the invention of a modified phenolic resin, as described above, which can be produced by reacting free hydroxyl groups of a novolac with esters of orthosilicic acid in which 1, 2 or 3 alcohol residues are replaced by substituted or unsubstituted hydrocarbon residues, wherein the novolac has a weight-average Mw of from 200 to 2000. Also preferred is the use according to the invention of a modified phenolic resin, as described above, which can be produced by reacting free hydroxyl groups of a novolac, with esters of orthosilicic acid in which 1, 2 or 3 alcohol residues are replaced by substituted or unsubstituted hydrocarbon residues, wherein the novolac has an average number of phenol units per molecule of more than 8, preferably 9 or more, particularly preferably 10 or more and more particularly preferably 12 or more.

Likewise preferred is the use according to the invention of a modified phenolic resin according to the second aspect of the present invention, in particular a modified phenolic resin as referred to above as preferred, wherein it comprises phenolic resin units that are linked by esters of orthosilicic acid in which 1, 2 or 3 alcohol residues are replaced by substituted or unsubstituted hydrocarbon residues, modified phenolic resins in which individual, a plurality of or the majority of the orthosilicic acid ester units, in which 1 or 2 alcohol residues are replaced by substituted or unsubstituted hydrocarbon residues, are linked to exactly two phenolic resin units being particularly preferred. The phenolic resins used in this case thus contain the following structural element:

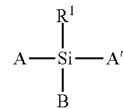

B is OR or $R^1$. R and $R^1$ are as described above. The groups A and A' are independently of one another phenolic resin units which may additionally be linked to one another in a way which is not represented.

The effects of the present invention are based at least in part on the fact that silicon atoms and phenolic resin units are bonded to one another by covalent bonds, and form thermally very stable units. It is therefore preferred that as many as possible of the bonds of the silicon atoms present in the phenolic resins according to the invention are directly connected to phenolic resin units. A use according to the invention is therefore preferred, wherein the modified phenolic resin comprises phenolic resin units which are substituted and/or linked by esters of orthosilicic acid in which 1, 2 or 3 alcohol residues are replaced by substituted or unsubstituted hydrocarbon residues, 50%, preferably 80%, particularly preferably 90% and more particularly preferably 98% of the silicon atoms present in the modified phenolic resin being connected to at least one phenolic resin unit. Condensates which result from partial hydrolysis and subsequent condensation of esters of orthosilicic acid, in which 1, 2 or 3 alcohol residues are replaced by substituted or unsubstituted hydrocarbon residues, are less suitable for the use according to the present invention since here at least some of the valencies of the silicon atoms cannot be linked to phenolic resin units. This applies for all embodiments described here.

In phenolic resin units in which phenolic OH groups are etherified into alkoxy groups, these phenolic OH groups cannot be bonded to silicon atoms because of the blocking. The use according to the invention of modified phenolic resins which contain etherified OH groups is therefore likewise less preferred.

Particularly preferred is the use of a modified phenolic resin which can be produced by a method in which free hydroxyl groups of a phenolic resin are reacted with a dialkyldialkoxysilane, preferably with diethoxydimethylsilane, so that the modified phenolic resin is obtained.

Also particularly preferred is the use of a modified phenolic resin, which can be produced by a method in which free hydroxyl groups of a novolac, a resol or a high o,o'-resol, preferably a high o,o'-resol, are reacted with a dialkyldialkoxysilane, preferably with diethoxydimethylsilane, so that the modified phenolic resin is obtained, as a binder or constituent of a binder, in particular for binding foundry molding materials.

Most preferred is the use of a modified phenolic resin, wherein the modified phenolic resin can be produced by a method in which free hydroxyl groups of a phenol-formaldehyde novolac, a phenol-o-cresol-formaldehyde novolac and/or a phenol-formaldehyde high-o,o'-resol are reacted with a dialkyldialkoxysilane, preferably with diethoxydimethylsilane, so that the modified phenolic resin is obtained.

A modified phenolic resin according to the invention (preferably referred to above as preferred) having a pH in the range of 6.0-7.0 is in particular also preferred.

In domestic studies, it was found that the use of phenolic resins that contain silicon in a form which leads to the formation of $SiO_2$ residues by pyrolysis, as a binder or in other applications, leads to advantageous properties without other desired properties, in particular the strength of molded bodies thereby produced, being compromised, or being significantly compromised. In particular, when they are used for binding foundry molding materials, nasal nuisance, pollution emission, condensate formation and/or gas evolution are reduced and the thermal stability is often increased. It is in this case preferred for the majority of the silicon atoms to be connected to the rest of the phenolic resin by at least one covalent bond. Similar considerations apply for other applications.

The use according to the invention (as described above) of a modified phenolic resin is likewise preferred wherein, when heated in air to 1000° C. in a muffle furnace to constant mass, the modified phenolic resin gives an $SiO_2$ residue of from 1 percent by weight to 30 percent by weight, preferably from 2 percent by weight to 30 percent by weight, particularly preferably from 3 percent by weight to 30 percent by weight, more particularly preferably from 5 percent by weight to 25 percent by weight and most preferably from 7 percent by weight to 20 percent by weight, expressed in terms of the weight of the mass of modified phenolic resin used.

If the $SiO_2$ residue (and therefore the proportion of bound silicon in the modified phenolic resin) is too small, then the advantageous effects of the present invention are not sufficiently pronounced. This applies in particular for the reduction of off-gases in foundry processes. If the $SiO_2$ residue is too high, then the effect of the modified phenolic resins as binders is not always sufficient.

Another subject matter of the present invention relates to new modified phenolic resins comprising phenolic resin units which are substituted and/or linked (and therefore modified) by esters of orthosilicic acid in which 1, 2 or 3 alcohol residues are replaced by substituted or unsubstituted hydrocarbon residues, and/or which can be produced by reacting free hydroxyl groups of a phenolic resin with one or more esters of orthosilicic acid in which 1, 2 or 3 alcohol residues are replaced by substituted or unsubstituted hydrocarbon residues. Preferred are new modified phenolic resins, comprising phenolic resin units, which can be produced by reacting free hydroxyl groups of a phenolic resin (basic resin) with one or more esters of orthosilicic acid, in which 1, 2 or 3 alcohol residues are replaced by substituted or unsubstituted hydrocarbon residues, wherein the phenolic resin (basic resin) has an average number of phenol units per molecule of more than 8, preferably 9 or more, particularly preferably 10 or more and more particularly preferably 12 or more. Reacting free hydroxyl groups of a phenolic resin with one or more esters of orthosilicic acid in which 1, 2 or 3 alcohol residues are replaced by substituted or unsubstituted hydrocarbon residues, regularly produces a modified phenolic resin that comprises phenolic resin units which are substituted and/or linked (and are therefore modified) by esters of orthosilicic acid in which 1, 2 or 3 alcohol residues are replaced by substituted or unsubstituted hydrocarbon residues. These new, modified phenolic resins are preferably used in the way according to the invention. A modified phenolic resin according to the invention, in which the phenolic resin units are novolac, resol and/or high o,o'-resol units, is in this case particularly preferred. Particularly preferred is a phenolic resin modified according to the invention comprising high o,o'-resol units, wherein individual, a plurality of or all of the phenolic resin units are high o,o'-resol units. Most preferred is a modified phenolic resin
comprising phenolic resin units which are substituted and/or linked by esters of orthosilicic acid in which 1, 2 or 3 alcohol residues are replaced by substituted or unsubstituted hydrocarbon residues, and/or which can be produced by reacting free hydroxyl groups of a phenolic resin with one or more esters of orthosilicic acid in which 1, 2 or 3 alcohol residues are replaced by substituted or unsubstituted hydrocarbon residues, and wherein, when heated in air to 1000° C. in a muffle furnace to constant mass, the modified phenolic resin gives an $SiO_2$ residue in the range of from 2 percent by weight to 30 percent by weight, expressed in terms of the weight of the mass of modified phenolic resin used.

Preferred is a modified phenolic resin which comprises phenolic resin units that are substituted and/or linked by esters of orthosilicic acid in which 1, 2 or 3 alcohol residues are replaced by substituted or unsubstituted hydrocarbon residues, 50%, preferably 80%, particularly preferably 90% and more particularly preferably 98% of the silicon atoms present in the modified phenolic resin being connected to at least one phenolic resin unit. Modified phenolic resins which contain or are produced from condensates which result from partial hydrolysis and subsequent condensation of esters of orthosilicic acid, in which 1, 2 or 3 alcohol residues are replaced by substituted or unsubstituted hydrocarbon residues, are less suitable for the use according to the present invention since here at least some of the valencies of the silicon atoms cannot be linked to phenolic resin units. This applies for all embodiments described here.

Also preferred is a phenolic resin modified according to the invention, preferably a modified phenolic resin referred to above as preferred, comprising phenolic resin units which are linked by esters of orthosilicic acid in which 1 or 2 alcohol residues are replaced by substituted or unsubstituted hydrocarbon residues, wherein individual or a plurality of orthosilicic acid esters in which 1 or 2 alcohol residues are replaced by substituted or unsubstituted hydrocarbon residues are linked to exactly two phenolic resin units.

Particularly preferred is a phenolic resin modified according to the invention which can be produced by a method in which free hydroxyl groups of a phenolic resin are reacted with a dialkyldialkoxysilane, preferably with diethoxydimethylsilane, so that the modified phenolic resin is obtained.

Particularly preferred in this case is a phenolic resin modified according to the invention (preferably referred to above as preferred) which can be produced by a method in which free hydroxyl groups of a novolac, a resol or a high o,o'-resol, preferably a high o,o'-resol, are reacted with a dialkyldialkoxysilane, preferably with diethoxydimethylsilane, so that the modified phenolic resin is obtained.

Most preferred in this case is a modified phenolic resin according to the invention (preferably referred to above as preferred) which can be produced by a method in which free hydroxyl groups of a phenol-formaldehyde novolac, a phenol-o-cresol-formaldehyde novolac and/or a phenol-formaldehyde high-o,o'-resol are reacted with a dialkyldialkoxysilane, preferably with diethoxydimethylsilane, so that the modified phenolic resin is obtained.

The modified phenolic resins defined above are distinguished by high thermal stability.

Another subject matter of the invention relates to a two-component binder system consisting of a phenolic resin component and a polyisocyanate component, wherein the polyisocyanate component comprises a polyisocyanate having at least two isocyanate groups per molecule and the phenolic resin component comprises one of the phenolic resins modified according to the invention as defined above according to the second aspect of the present invention. The phenolic resin component preferably comprises one of the new modified phenolic resins described above according to the second aspect of the present invention.

It has surprisingly been found that phenolic resins, in particular phenol-formaldehyde novolacs, phenol-o-cresol-formaldehyde novolacs and benzyl ether resins (high-o,o'-resols) (which are typical resins for application as a basic resin in the cold-box method) can be reacted with esters of orthosilicic acid in which 1 or 2 alcohol residues are replaced by substituted or unsubstituted hydrocarbon residues, in particular diethoxydimethylsilane, to form modified phenolic resins having outstanding, unexpected properties.

Another subject matter according to the second aspect of the invention therefore relates to a method for producing a modified phenolic resin, comprising the following step:

reacting a phenolic resin with at least one ester of orthosilicic acid in which 1, 2 or 3 alcohol residues are replaced by substituted or unsubstituted hydrocarbon residues, so as to obtain a modified phenolic resin in which the phenolic resin units are substituted or linked by esters of orthosilicic acid in which 1 or 2 alcohol residues are replaced by substituted or unsubstituted hydrocarbon residues.

A method according to the invention, as described above, comprising the following steps is preferred:

i. preparing a reaction mixture comprising or consisting of a novolac, at least one tetraalkyl ester of orthosilicic acid in which 1, 2 or 3 alcohol residues are replaced by substituted or unsubstituted hydrocarbon residues, and an acid having a $pK_a \leq 5$, preferably having a $pK_a \leq 3$ and particularly preferably having a $pK_a \leq 1$, wherein the ratio of the amount of silicon to the weight of basic resin used lies in the range of from 0.5 to 20.0 mol of Si per kg of resin, preferably in the range of from 1 to 5 mol of Si per kg of resin, and particularly preferably in the range of from 1 to 2.5 mol of Si per kg of resin, and in which the ratio of the equivalents of the alcohol residues in the total amount of esters of orthosilicic acids to the equivalents of the phenolic OH groups in the total amount of novolac is less than 1, preferably less than 0.8 and particularly preferably less than 0.6, ii. reacting the prepared reaction mixture at a temperature in the range of from 20 to 200° C., preferably 20-150° C., and distilling off the resulting alcohol from the reaction mixture, iii. optionally neutralizing or partially neutralizing the reaction mixture after removal of the alcohol.

Regarding the reaction (transesterification reaction) of the silicic acid esters with the phenolic resin, regarding the core production, regarding the method for producing a hardened foundry mold or a hardened foundry core, regarding the hardened foundry molds or hardened foundry cores themselves, regarding the use of the solutions of the phenolic resins according to the invention and the solutions themselves, the statements for the first aspect moreover respectively apply correspondingly (with the necessary changes) beginning on page 9 [of the English] with the words "The transesterification of the silicic acid ester with the phenolic resin", and ending on page 20 [of the English] with the words "The odor during production of the foundry mold and foundry cores is significantly reduced compared with standard systems". The term "esters of orthosilicic acid" is in this case accordingly to be replaced by "esters of orthosilicic acid in which 1, 2 or 3 alcohol residues are replaced by substituted or unsubstituted hydrocarbon residues". The term "tetraethyl esters of orthosilicic acid" is in this case accordingly to be replaced by "tetraethyl esters of orthosilicic acid in which 1, 2 or 3 alcohol residues are replaced by substituted or unsubstituted hydrocarbon residues". "TES" is to be replaced by "diethoxydimethylsilane", if it is not used as a solvent.

A specific example according to the second aspect of the present invention for the reaction of a phenolic resin with an ester of orthosilicic acid, in which 1, 2 or 3 alcohol residues are replaced by substituted or unsubstituted hydrocarbon residues, is given below as Example 5.

The second aspect of the present invention therefore—as mentioned—relates in particular to the use of a modified phenolic resin as a binder or a constituent of a binder, in particular for binding foundry molding materials, and furthermore use as a binder for insulating materials, in particular as a binder for glass fiber insulating materials, a molding material or a constituent of a molding material, in particular as an industrial resin, for example as a grinding disk resin and/or as a composite material, an insulator or a constituent of an insulator, in particular as an electrical insulator or as a constituent thereof, and preferably as a base material for the production of printed circuit boards (circuit cards), as insulation of printed circuit boards or as insulation of semiconductor elements or other components which are employed in the semiconductor industry, or as a coating material or a constituent of a coating material, wherein the modified phenolic resin comprises phenolic resin units which are substituted and/or linked by esters of ortho-silicic acid, in which 1, 2 or 3 alcohol residues are replaced by substituted or unsubstituted hydrocarbon residues. In each case, the statements above apply accordingly.

General Information

By division of the present application into individual aspects, preferred embodiments and subject matters, it is not intended that the applications described in these aspects, embodiments and subject matters apply merely to this aspect, this embodiment or this subject matter. Many applications and therefore corresponding uses, methods and modified phenolic resins may also be implemented by means of the method according to the invention with features other than as described in the respective preferred embodiment. The corresponding possible uses may regularly also be generalized beyond the respective preferred embodiment according to the invention in the scope of the most general form of the invention, so that the feature combinations described in the respective aspect, the respective preferred embodiment or the subject matter merely represent a preferred variant of the concept of the invention. Furthermore, it is clear to the person skilled in the art that the aspects, embodiments and subject matters, or individual measures/features of the individual aspects, embodiments and subject matters may also be combined with one another, depending on the purpose of the application. Many phenolic resins, uses and methods according to the invention also fulfill the features/functions of more than one preferred embodiment at the same time.

The invention will be described in more detail below with the aid of examples:

EXAMPLES

In what follows, the abbreviation "PW" stands for parts by weight, "MDI" for methylene-bis-(phenylisocyanate), TES for tetraethylsilicate and "PTS" for para-toluenesulfonic acid.

The sand types "H32" and "H33" are available from the company Quarzwerke in 50226 Frechen, Germany.

Resins A, B and C are according to the invention. Resins D, E and F are not according to the invention.

Analytical Methods:

Residue Determination

For the residue determination, 2 g of a resin are introduced in a normal atmosphere into a muffle furnace preheated to 1000° C. and kept at this temperature until constant weight. The residue is weighed.

Determination of the OH Number 0.8 g-1.2 g of phenolic resin are weighed into a 250 ml round-bottomed flask to an accuracy of 0.1 mg. Before weighing in, the sample material is heated in a microwave oven until the resin is readily mixable (about 30-60 s). 10 ml of a mixture of 78.5 ml of pyridine and 21.5 ml of acetic acid are added to it. The samples are heated by means of a heating mantle under reflux to 100±1° C. and kept at this temperature for 1 hour. The samples are allowed to cool slowly to room temperature, without using additional cooling. 5 ml of o-dichlorobenzene and 5 ml of water are added through the cooler, then the mixture is briefly allowed to cool again (1 to 2 minutes). The cooler is flushed with 25 of pyridine, the flushing pyridine being allowed to flow into the acetylation flask. Phenolphthalein is added and titrated with 1 mol/l NaOH until the start of red coloration (stirring mechanism). The titration is additionally monitored using a pH meter. When reaching the end point a pH jump is evident, which begins at pH 10.5-11.0. A blind test is furthermore carried out without phenolic resin. The OH number is calculated according to the following formula: OH number=(consumption of NaOH in the blind test (ml)−consumption of sample (ml))* 56.109/weigh-in of the phenolic resin (g)

Of the following Examples 1 to 5 given below, Examples 1 to 4 relate to the first aspect of the present invention and Example 5 to the second aspect of the present invention.

Example 1

Production of an o-cresol-phenol Novolac Reacted with TES (Resin A)

Step 1: Production of an o-cresol-phenol Novolac

81 PW of phenol, 105 PW of o-cresol, 23.5 PW of formalin (49 wt. % formaldehyde) and 0.8 PW of oxalic acid are put into a reaction vessel equipped with a reflux cooler, thermometer and stirrer. While stirring, the mixture is heated to 100° C. and kept at this temperature until the free formaldehyde content has fallen below 0.2 wt. % (duration: about 3-4 hours). The volatile constituents are then distilled off by heating to 160° C. at atmospheric pressure and then at 180° C. and 20 mbar. The yield is about 83%.

Step 2: Silylation of the Novolac

400 PW of the resin produced in step 1 are mixed with 100 PW of tetraethyl silicate at 120° C. After adding 0.5 PW of para-toluenesulfonic acid monohydrate, it is heated to 130° C. over 10 minutes and distilled atmospherically over 60 minutes up to 160° C. The pressure is subsequently reduced stepwise at 160° C. over 10 minutes down to 100 mbar, and distillation is carried out for a further 10 minutes at 100 mbar. (Distillate: about 40 PW) Finally, it is stoichiometrically neutralized at 130° C. with a gamma-aminopropyltriethoxysilane solution (1% in tetraethyl silicate). 1 PW of the product obtained is dissolved in 1 PW of tetraethyl silicate. The solution obtained of the modified phenolic resin according to the invention is denoted below as resin A.

Example 2

Production of a Phenol Novolac Reacted with TES (Resin B)

Step 1: Production of the Phenol Novolac (Basic Resin; Referred to Below as Resin F; Not According to the Invention)

94 PW of phenol, 33.7 PW of formalin (49 wt. % formaldehyde) and 1.2 PW of oxalic acid are put into a reaction vessel equipped with a reflux cooler, thermometer and stirrer. While stirring, the mixture is heated to 100° C. and kept at this temperature until the free formaldehyde content has fallen below 0.2 wt. %. The volatile constituents are then distilled off by heating to 170° C. at atmospheric pressure and then at 180° C. and 20 mbar. The yield is about 60%. This resin is referred to below as resin F.

The residue determination gives 10 mg (0.5%) of a white residue.

Step 2: Silylation of the Novolac

400 PW of the phenol novolac produced in step 1 (resin F) are mixed with 100 PW of tetraethyl silicate at 130° C. After adding 0.25 PW of para-toluenesulfonic acid monohydrate, the temperature is kept constant. After 40 minutes, the mixture starts to distil at 130° C. and normal pressure. After a further 10 minutes, the pressure is reduced uniformly over 40 minutes to 65 mbar while the temperature is kept constant, the volatile components being distilled off The product, a modified phenolic resin according to the invention, is then poured out, allowed to cool and broken; it is denoted below as resin B.

Example 3

Production of a High o,o'-resol Reacted with TES (Resin C)

Step 1: Production of the High o,o'-resol

234 PW of phenol, 107 PW of paraformaldehyde (91 wt. % paraformaldehyde) and 0.30 PW of zinc acetate dihydrate are put into a reaction vessel equipped with a reflux cooler, thermometer and stirrer. While stirring, the mixture is heated uniformly to 110° C. over 90 minutes and kept at 110° C. for 45 minutes. It is heated to 120° C. and distilled at reduced pressure (<30 mbar), until the distillation residue has a refractive index of $N_{D20}$=1.613 to 1.615. The yield is about 80%.

Step 2: Silylation and Etherification of the High o,o'-resol

100 PW of the high o,o'-resol produced in step 1 and 100 PW of TES are mixed at 90° C. A white emulsion is obtained. 10 PW of ethanol (water<0.03 wt. %) are added thereto so that the solution only still has weak turbidity. 0.56 PW of a 65 percent by weight solution of para-toluenesulfonic acid in water are added to this batch. The temperature is maintained for 30 minutes and the batch is finally neutralized with 0.42 PW of gamma-aminopropyltriethoxysilane. Lastly, it is distilled at 70 mbar up to a temperature of 80° C. in the bottom. The yield is about 81%. The pH of the product is 6.4 (for determination of the pH values, see above).

30 PW of tetraethyl silicate are added to 100 PW of the product obtained, a modified phenolic resin according to the invention. The solution obtained is denoted below as resin C.

Resin C has an OH number of 244 mg KOH/g of resin. The residue determination gives 182 mg (9.1%) of a white residue (essentially amorphous $SiO_2$).

Example 4

Production of a Resol Reacted with TES

Step 1: Production of the Resol

100 PW of phenol, 36 PW of paraformaldehyde (91 wt. % paraformaldehyde content) and 0.63 PW of sodium hydroxide solution (33 wt. %) are put into a reaction vessel equipped with a reflux cooler, thermometer and stirrer. The apparatus is adjusted so that distilling liquid is returned into the flask. While stirring, the temperature is increased uniformly to 85° C. in 90 minutes. As soon as the paraformaldehyde has fully entered solution (at about 80° C.), an exothermic reaction has to be dealt with. When the pressure in the apparatus is reduced to 200 mbar, the mixture boils under reflux conditions and the resulting energy can thus be dissipated. The flask may possibly need to be cooled with water. The temperature is kept at 85° C. until the free formaldehyde content has fallen to less than 2 wt. % (duration about 90 minutes). It is cooled to a temperature of 50° C. and neutralized by slow addition of in total 1 PW of para-toluenesulfonic acid (65 wt. % in water). 20 PW of propan-2-ol are added. With a reduced pressure of 50 mbar, azeotropic distillation is carried out at a temperature of 90° C. The water content in the mixture is now less than 1 wt. %. The yield is about 81 wt. %.

Step 2: Silylation of the Resol

100 PW of the resol produced in step, 75 PW of ethanol (water<0.03 wt. %) and 100 PW of TES are mixed and the temperature is adjusted to 80° C. The solution has weak turbidity. 0.40 PW of a 65 percent by weight solution of para-toluenesulfonic acid in water are added to this batch. The temperature is maintained for 30 minutes and the batch is finally neutralized with 0.30 PW of gamma-aminopropyltriethoxysilane. Lastly, it is distilled at 70 mbar up to a temperature of 90° C. in the bottom.

25 PW of tetraethyl silicate are added to 100 PW of the product obtained, a modified phenolic resin according to the invention. A solution suitable for use is obtained.

The residue determination gives 326 mg (16.3%) of a white residue (essentially amorphous $SiO_2$).

Example 5

Production of a High o,o'-resol Reacted with Diethoxydimethylsilane o,o'-resol (Resin G)

Step 1: Production of the High o,o'-resol According to Example 3, Step 1

Step 2: Silylation of the High o,o'-resol with Diethoxydimethylsilane

100 PW of the high o,o'-resol produced in step 1 and 74 PW of diethoxydimethylsilane are mixed at 80° C. A white emulsion is obtained. 10 PW of ethanol (water<0.03 wt. %) are added thereto, so that the solution only has weak turbidity. 0.61 PW of a 65 percent by weight solution of para-toluenesulfonic acid in water is added to this batch. The temperature is maintained for 30 minutes and the batch is finally neutralized with 0.42 PW of gamma-aminopropyltriethoxysilane. Lastly, it is distilled at 70 mbar up to a temperature of 90° C. in the bottom.

34 PW of tetraethyl silicate are added to 100 PW of the product obtained, a modified phenolic resin according to the invention. The solution obtained is denoted below as resin H.

The residue determination gives 138 mg (6.9%) of a white residue (essentially amorphous $SiO_2$).

Reference Resins:

In order to carry out comparative tests in the technical application examples, reference resins not according to the invention are required. The preparation is carried out as described below:

Resin D:

A high o,o'-resol is prepared according to Example 3, step 1. 100 PW of the product obtained are mixed with 37 PW of dibasic ester mixture (DBE), 37 PW of propylene carbonate and 7 PW of isopropyl laurate. The solution obtained is resin D.

Resin E:

A high o,o'-resol is prepared according to Example 3, step 1. 100 PW of the product obtained are mixed with 50 PW of tetraethyl silicate and 20 PW of dibasic ester mixture (DBE). The solution obtained is resin E. Resin E has an OH number of 366 mg KOH/g of resin.

Resin F:

The product from Example 2, step 1 is used as resin F.

Technical Application Examples

Technical Application Example 1

Core Technical Values

Sand mixture examples for use in the cold-box method were produced according to Table 1 below:

TABLE 1

| Mixture | Sand PW | Sand Name | Resin PW | Resin Name | Polyisocyanate PW | Polyisocyanate Name |
|---|---|---|---|---|---|---|
| 1 | 100 | H32 | 0.70 | Resin A | 0.70 | Activator A |
| 2 | 100 | H32 | 0.80 | Resin A | 0.60 | Activator A |
| 3 | 100 | H32 | 0.90 | Resin A | 0.50 | Activator A |
| 4 | 100 | H32 | 1.00 | Resin A | 0.40 | Activator A |
| 5 | 100 | H32 | 0.70 | Resin C | 0.70 | Activator A |
| 6 | 100 | H32 | 0.80 | Resin C | 0.60 | Activator A |
| 7 | 100 | H32 | 0.90 | Resin C | 0.50 | Activator A |
| 8 | 100 | H32 | 1.00 | Resin C | 0.40 | Activator A |
| 9 | 100 | H32 | 1.10 | Resin C | 0.30 | Activator A |
| 10 | 100 | H32 | 0.80 | Resin E | 0.6 | Activator A |
| 11 | 100 | H32 | 0.80 | Resin G | 0.6 | Activator A |

Activator A is a mixture of 90 PW of polymer diphenylmethane diisocyanate ("Lupramat M20S"), 7 PW of tetraethyl silicate, 3 PW of dioctyl adipate and 0.3 PW of phosphoryl chloride.

Test bodies are produced from the mixtures produced in this way, and their core technical values (bending strength) are measured. The results are collated in Table 2:

TABLE 2

Comparison of the bending strengths in N/cm² of the test bodies produced from the mixtures according to Table 1 (use in the cold-box method)

| Mixture | Immediate bending strengths im. | Immediate bending strengths 1 h | Immediate bending strengths 24 h | 1 hour bending strengths im. | 1 hour bending strengths 1 h | 1 hour bending strengths 24 h | 6 hour bending strengths im. | 6 hour bending strengths 1 h | 6 hour bending strengths 24 h | A cores 1 d | A cores 2 d | B cores 1 d | B cores 2 d | C cores | D cores | E cores 1 d | E cores 2 d | F cores 1 d | F cores 2 d |
|---|---|---|---|---|---|---|---|---|---|---|---|---|---|---|---|---|---|---|---|
| 1 | 200 | 410 | 470 | 180 | 390 | 420 | 150 | 310 | 350 | 420 | 440 | 380 | 420 | 560 | 540 | 320 | 350 | 410 | 350 |
| 2 | 230 | 370 | 420 | 220 | 330 | 360 | 180 | 290 | 290 | 400 | 390 | 380 | 400 | 560 | 530 | 240 | 270 | 370 | 270 |
| 3 | 240 | 320 | 370 | 190 | 290 | 330 | 160 | 230 | 250 | 360 | 380 | 300 | 380 | 460 | 430 | 310 | 320 | 360 | 320 |
| 4 | 210 | 290 | 320 | 180 | 240 | 280 | 140 | 200 | 210 | 350 | 340 | 310 | 340 | 390 | 400 | 270 | 280 | 300 | 280 |
| 5 | 160 | 360 | 440 | 160 | 370 | 400 | 120 | 280 | 330 | 370 | 310 | 400 | 380 | 470 | 520 | 330 | 320 | 380 | 360 |
| 6 | 200 | 340 | 400 | 190 | 310 | 340 | 150 | 250 | 270 | 340 | 350 | 370 | 360 | 450 | 480 | 380 | 290 | 370 | 280 |
| 7 | 200 | 310 | 340 | 190 | 280 | 300 | 130 | 190 | 210 | 340 | 340 | 330 | 320 | 410 | 400 | 260 | 230 | 330 | 240 |
| 8 | 190 | 260 | 270 | 160 | 220 | 220 | 110 | 160 | 160 | 250 | 250 | 260 | 380 | 360 | 350 | 190 | 190 | 260 | 210 |
| 9 | 130 | 170 | 160 | 120 | 150 | 130 | 80 | 90 | 90 | 150 | 140 | 160 | 160 | 310 | 280 | 120 | 130 | 130 | 120 |
| 10 | 210 | 340 | 390 | 180 | 340 | 360 | 110 | 260 | 270 | 400 | 410 | 370 | 390 | 520 | 460 | 380 | 370 | 360 | 370 |
| 11 | 200 | 380 | 420 | 120 | 260 | 300 | | | | | | | | | | | | | |

*) Strength values measured after 3 hours of sand storage

In Table 2 above, the entries in the columns have the following meanings:

Column 1: sequential numbers of the mixtures as in Table 1.

Immediate bending strengths (im., 1 h, 24 h): The sand mixture is processed immediately after production. The testing is carried out immediately, after 1 hour and after 24 hours of core storage.

1 hour bending strengths (im., 1 h, 24 h): The sand mixture is processed one hour after production. The testing is carried out immediately, after 1 hour and after 24 hours of core storage.

6 hour bending strengths (im., 1 h, 24 h): The sand mixture is processed 6 hours after production. The testing is carried out immediately, after 1 hour and after 24 hours of core storage.

A cores (1d): The cores are stored for one day in a digestor at RT. On the next day, they are immersed in water-based coatings, air-dried at RT in a digestor and tested after a further day.

A cores (2d): The cores are stored for one day in a digestor at RT. On the next day, they are immersed in water-based coatings, air-dried at RT in a digestor and tested after 2 days.

B cores (1d): The cores are immersed immediately in water-based coatings, air-dried at RT in a digestor and tested after one day.

B cores (2d): The cores are immersed immediately in water-based coatings, air-dried at RT in a digestor and tested after 2 days.

C cores: The cores are stored for one day in a digestor at RT. On the next day, they are immersed in water-based coatings, dried for one hour at 150° C. in an oven and tested after cooling to RT.

D cores: The cores are immersed immediately in water-based coatings, dried for one hour at 150° C. in an oven and tested after cooling to RT.

E cores (1d): The cores are stored for one day in a digestor at RT. They are then stored at 100% relative humidity for one day and tested comprehensively after removal.

E cores (2d): The cores are stored for one day in a digestor at RT. They are then stored at 100% relative humidity for two days and tested comprehensively after removal.

F cores (1d): The cores are stored immediately at 100% relative humidity for one day and tested comprehensively after removal.

F cores (2d): The cores are stored immediately at 100% relative humidity for two days and tested comprehensively after removal.

Technical Application Example 2

Gas Evolution Study (Gas Pressure Measurement)

Gas Evolution Study in Aluminum (Use in the Cold-Box Method)

Gas pressure measurements were carried out according to the instructions of H. Gerard Levelink et al., Gießerei 67 (1980) No. 5, page 110 "Untersuchungsverfahren" [study methods].

In the gas pressure measurement, a test body is therefore made from a mixture of sand, resin and a polyisocyanate and subsequently immersed at 800° C. in liquid aluminum. The pressure p (in millibar) of the resulting gas is measured via an embedded tube and plotted against time t (in seconds). The result is represented in FIG. 1.

Resin C, according to Example 3, and resin D not according to the invention are compared with one another. To this end, a mixture of 100 PW of sand H32, 0.9 PW of resin C and 0.6 PW of polymer diphenylmethane diisocyanate ("Lupramat M20S") are processed to form a test body. A reference mixture of 100 PW of sand H32, 0.7 PW of resin D and 0.7 PW of activator B are furthermore processed to form a test body. Activator B is a mixture of 80 PW of polymeric diphenylmethane diisocyanate ("Lupramat M20S"), 20 PW of Solvesso 150 and 0.3 PW of phosphoryl chloride.

The results are presented in FIG. 1. The abscissa indicates the time in seconds and the ordinate the gas pressure in millibar. The solid curve shows the measurement values for resin C according to the invention. The dashed curve shows the measurement values for resin D not according to the invention.

For the conventional system (resin D), two gas surges occur. For the resin C according to the invention, on the other hand, there is only one gas surge and no second gas surge takes place.

Technical Application Example 3

Thermogravimetric Analysis (TGA)

Thermogravimetric analyses (TGA) was carried out with a device of the type TGA 7 from the company Perkin Elmer. The software "Pyris Basis" and "Kinetikmodul" was used.

For the sample preparation, phenolic resin and polyisocyanate are mixed. A few drops of the mixture are applied circularly onto a smooth surface (diameter about 5 cm) and gaseous dimethyl isopropylamine is passed over this. The film formed is removed using tweezers, has liquid binder removed from it by dabbing with an absorbent, lint-free paper and is flushed fully again with gaseous amine. An approximately 1 cm wide strip of this film is cut out and folded so as to form a sample weighing approximately 8 mg, which is analyzed by TGA. Resin C (according to Example 3) was hardened with activator A in a weight ratio of 3 to 2 over amine and the product was analyzed with the aid of thermogravimetric analysis. Resin E with activator A was used as a reference, likewise in a weight ratio of 3 to 2. For the measurement, the samples were heated in nitrogen to 1000° C. with a heating rate of 30° C. per minute.

Figure 2:
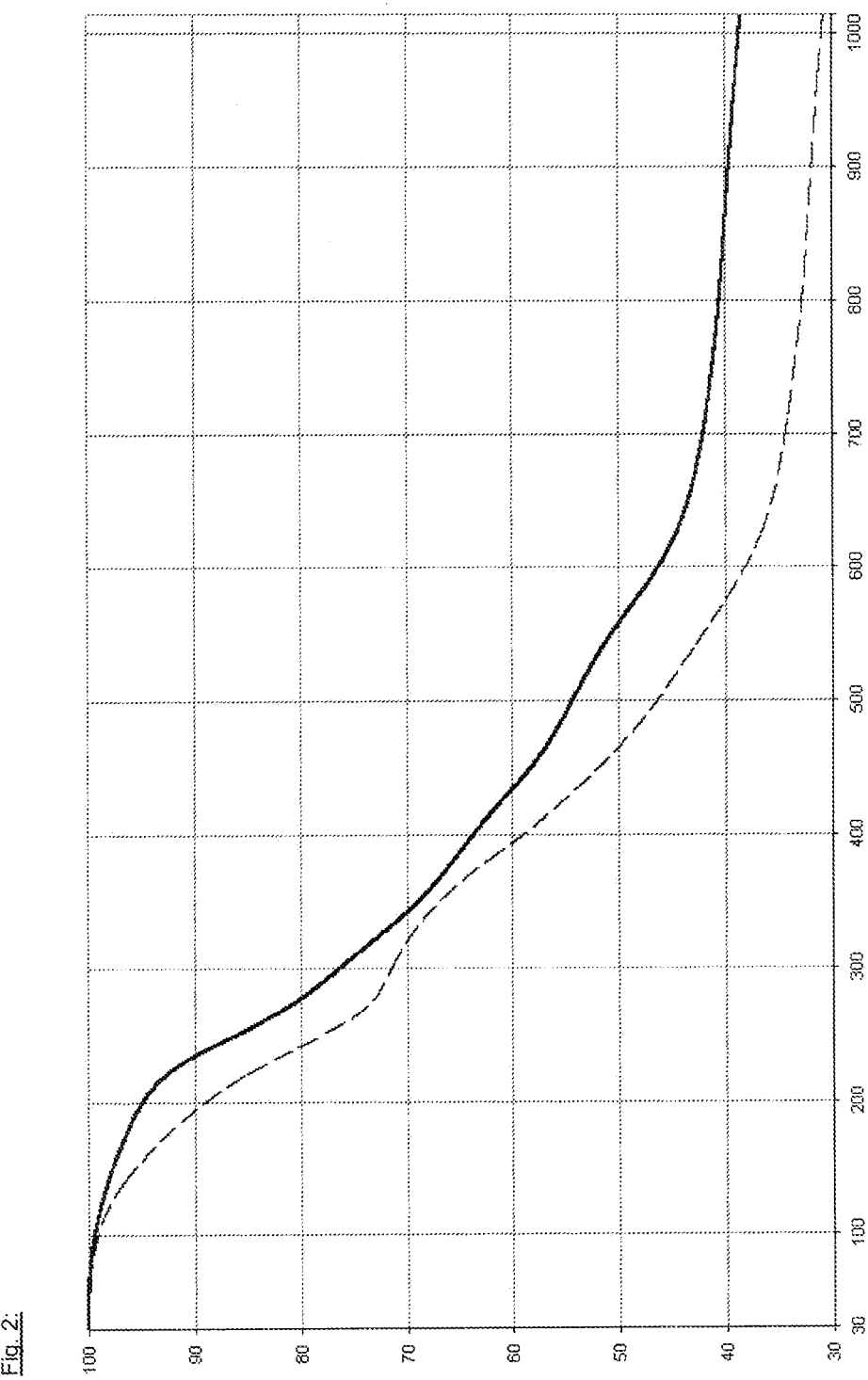
FIG. 2 is a graph showing temperature versus mass for various resins.
Figure 3:
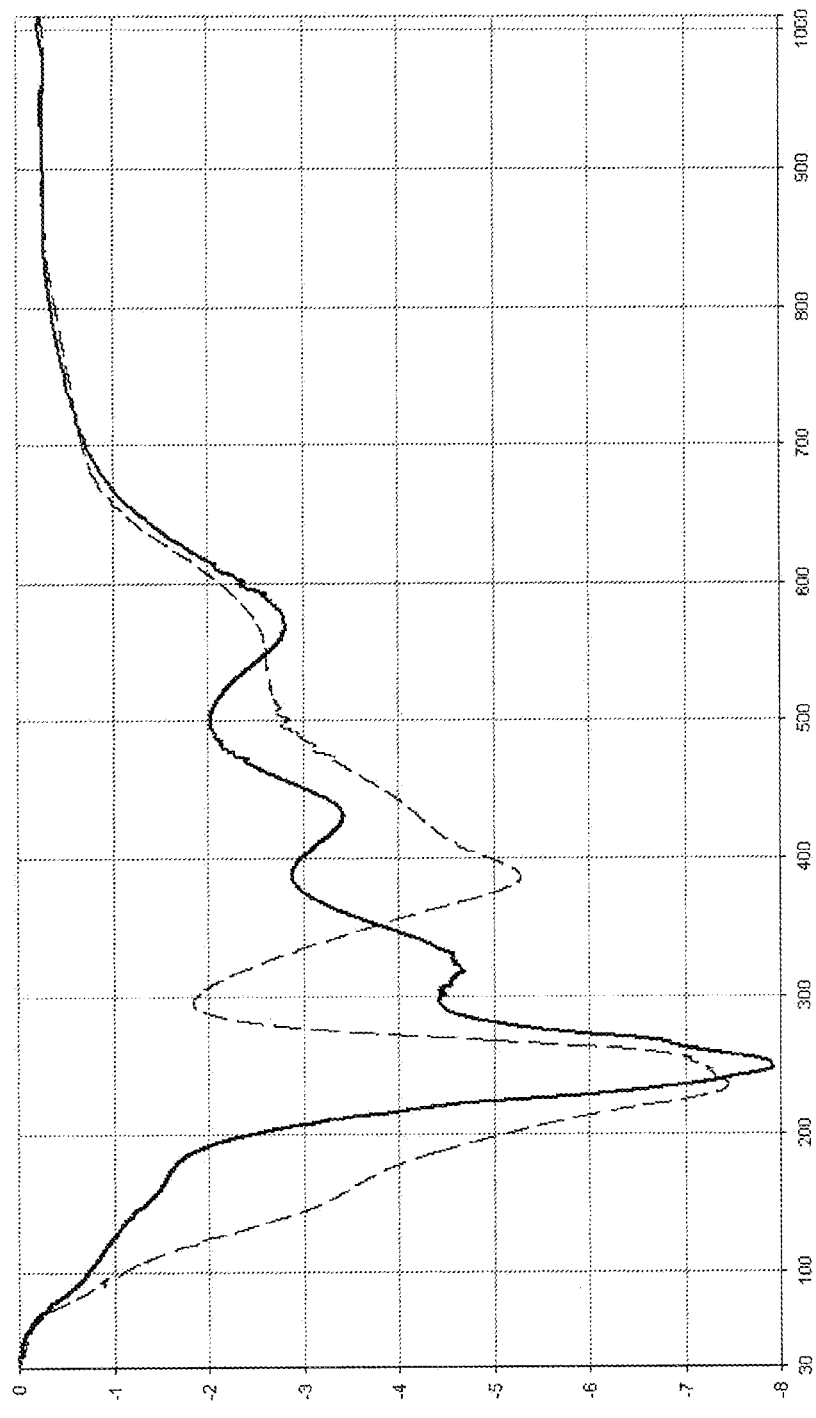
FIG. 3 is a graph showing the mass loss per unit time versus temperature for various resins.

The results are presented in FIGS. 2 and 3. FIG. 2 shows the decrease in the mass of the sample with increasing temperature for a heating rate of 30° C. per minute. The temperature is plotted in degrees Celsius on the abscissa. The mass of the sample in percent by weight of the original mass is plotted on the ordinate. The solid curve shows the measurement values for the film which was produced with resin C according to the invention. The dashed curve shows the measurement values for the film which was produced with resin E not according to the invention.

The following results can be inferred from FIG. 2:

1. Resin E not according to the invention already experiences a significant mass loss at temperatures of between 100 and 200° C., while resin C according to the invention does not exhibit significant mass losses until temperatures above 200° C. Resin C according to the invention is thus more thermally resistant than resin E not according to the invention.

2. The total mass loss when using resin E not according to the invention, throughout the range of temperatures above 100° C., is greater than the mass loss when using resin C according to the invention. At 1000° C., when using resin E not according to the invention, about 69% of the sample has been converted into the gaseous state, while when using resin C the quantity is about 61%. In comparison, this means that in foundry molds and cores according to the invention about 26% more residue remains compared with conventional systems. Consequently, the total gas emission is significantly reduced.

FIG. 3 shows the mass loss of the sample per unit time as a function of temperature. This curve is the derivative of the curve of FIG. 2 as a function of time. The temperature is plotted in degrees Celsius on the abscissa. The mass loss of the sample per unit time in percent by weight of the original mass is plotted on the ordinate. The solid curve shows the measurement values for the film which was produced with resin C according to the invention. The dashed curve shows the measurement values for the film which was produced with resin E not according to the invention.

It can be seen clearly from this that resin E not according to the invention already experiences a strong mass loss at temperatures of between 100 and 200° C., while resin C according to the invention does not exhibit strong mass losses until temperatures above 200° C. When using resin C according to the invention, the mass loss at temperatures of between 250 and 800° C. is furthermore significantly more uniform than when using resin E not according to the invention. This leads to smaller variations in the gas pressure, which in turn leads to a reduction in the number of gas defects.

Technical Application Example 4

Technical Application Testing in the Shell Molding Method

Sand Mixture Example

Shell Molding Method 3 kg of sand (H33) were mixed with 90 g of resin B described above (Example 2) at about 130° C. 27 g of a 35% strength hexamethylenetetramine solution (crosslinker) were then added, followed by 6 g of potassium stearate (release agent). The sand mixture for resin F was produced according to the same procedure with the same quantity ratios. "GF" test bodies were produced from the sand mixtures according to VDG instruction sheet P 74 (publisher "Verein Deutscher Gießereifachleute", 2nd edition, March 1976) and tested. Two tests were carried out in each case for the resin according to the invention.

TABLE 3

| | Resin B (modified) | | |
|---|---|---|---|
| Bending bar | Test 1 | Test 2 | Resin F |
| Shell molding method GF test body: Bending bar is hardened for 2 minutes at 220° C. and immediately tested in the hot state. | 360 N/cm² | 380 N/cm² | 260 N/cm² |
| Shell molding method GF test body: Bending bar is hardened for 1 minute at 220° C. and immediately tested in the hot state. | 270 N/cm² | 290 N/cm² | 220 N/cm² |
| Shell molding method GF test body: Bending bar is hardened for 2 minutes at 220° C. and tested after cooling. | 1000 N/cm² | 900 N/cm² | 1100 N/cm² |
| Shell molding method GF test body: Bending bar is hardened for 1 minute at 220° C. and tested after cooling. | 830 N/cm² | 830 N/cm² | 840 N/cm² |
| Odor in comparison with standard systems | reduced | reduced | intense odor |

The invention claimed is:

1. A foundry mold hardened in the cold-box method or polyurethane no-bake method or a hardened foundry core, comprising a molding material and a hardened binder, the binder comprising phenolic resin units which are substituted and/or linked by esters of orthosilicic acid in which 1, 2 or 3 alcohol residues are replaced by substituted or unsubstituted hydrocarbon residues, wherein the phenolic resin is a high a o,o'-resol, wherein said binder, prior to hardening, forms a solution with a solvent comprising tetraethyl silicate.

2. A modified phenolic resin, comprising phenolic resin units which are substituted and/or linked by esters of orthosilicic acid in which 1, 2 or 3 alcohol residues are replaced by substituted or unsubstituted hydrocarbon residues, wherein the phenolic resin is a high o,o'-resol, and/or which can be produced by reacting free hydroxyl groups of a high o,o'-resol phenolic resin with one or more esters of orthosilicic acid in which 1, 2 or 3 alcohol residues are replaced by substituted or unsubstituted hydrocarbon residues, wherein said modified phenolic resin forms a solution with a solvent comprising tetraethyl silicate.

3. The modified phenolic resin as claimed in claim 2, comprising phenolic resin units which are linked by esters of orthosilicic acid in which 1 or 2 alcohol residues are replaced by substituted or unsubstituted hydrocarbon residues, wherein individual or a plurality of esters of orthosilicic acid in which 1 or 2 alcohol residues are replaced by substituted or unsubstituted hydrocarbon residues and are linked to exactly two phenolic resin units.

4. The modified phenolic resin as claimed in claim 2, which can be produced by a method in which free hydroxyl groups of a phenolic resin are reacted with diethoxydimethylsilane so that the modified phenolic resin is obtained.

5. The modified phenolic resin as claimed in claim 2, which can be produced by a method in which free hydroxyl groups of a high o,o'-resol are reacted with a dialkyldialkoxysilane so that the modified phenolic resin is obtained.

6. The modified phenolic resin as claimed in claim 2, which can be produced by a method in which free hydroxyl groups of a phenol-formaldehyde high-o,o'-resol are reacted with a dialkyldialkoxysilane so that the modified phenolic resin is obtained.

7. The modified phenolic resin as claimed in claim 2, wherein said modified phenolic resin is produced by a process comprising:
   i. preparing a reaction mixture comprising or consisting of a high o,o'-resol, at least one alkyl ester of orthosilicic acid in which 1, 2 or 3 alcohol residues are replaced by substituted or unsubstituted hydrocarbon residues, and an acid having a pKa≤5, wherein the ratio of the amount of silicon to the weight of basic resin used lies in the range of from 0.5 to 20.0 mol of Si per kg of resin,
   ii. reacting the mixture at a temperature in the range of from 20 to 120° C., with a reaction time in the range of from 1 minute to 20 hours,
   iii. neutralizing the reaction mixture reacted according to step ii,
   iv. distilling off the alcohol formed during the reaction according to step ii and optionally a solvent from the neutralized reaction mixture at reduced pressure.

8. The modified phenolic resin as claimed in claim 2, wherein said modified phenolic resin forms a solution in tetraethyl silicate.

9. A method tor making a product, comprising:
   providing a modified phenolic resin according to claim 2, wherein the modified phenolic resin comprises phenolic resin units which are substituted and/or linked by esters orthosilicic acid in which 1, 2 or 3 alcohol residues are replaced by substituted or unsubstituted hydrocarbon residues, and/or
   can be produced by reacting free hydroxyl groups of a phenolic resin with one or more esters or orthosilicic acid in which 1, 2 or 3 alcohol residues are replaced by substituted or unsubstituted hydrocarbon residues; and
   wherein the modified phenolic resin is:
   a binder or a constituent of a binder,
   a molding material or a constituent of a molding material,
   an insulator or a constituent of an insulator, or
   a coating materiel or a constituent of a coating material.

10. The method as claimed in claim 9, wherein the modified phenolic resin comprises phenolic resin units which are linked by esters of orthosilicic acid in which 1 or 2 alcohol residues are replaced by substituted or unsubstituted hydrocarbon residues.

11. The method as claimed in claim 10, wherein individual, a plurality of or the majority of the orthosilicic acid ester units in which 1 or 2 residues are replaced by substituted or unsubstituted hydrocarbon residues are linked to exactly two phenolic resin units.

12. The method as claimed in claim 9, wherein the modified phenolic resin is produced by a method in which free hydroxyl groups of a phenolic resin are reacted with a dialkyldialkoxysilane so that the modified phenolic resin is obtained.

13. The method as claimed in claim 12, wherein the dialkyldiakoxysilane comprises diethoxydimethylsilane.

14. The method as claimed in claim 9, wherein the modified phenolic resin is produced by reacting free hydroxyl groups of a high o,o'-resol with a dialkyldialkoxysilane.

15. The method as claimed in claim 9, wherein the modified phenolic resin is produced by reacting free hydroxyl groups of a phenol-formaldehyde high-o,o'-resol with a dialkyldialkoxysilane.

16. The method as claimed in claim 9, wherein, when heated in air to 1000° C. in a muffle furnace to constant mass, the modified phenolic resin gives an $SiO_2$ residue of from 1 percent by weight to 30 percent by weight, expressed in terms of the weight of the mass of modified phenolic resin used.

17. A method for producing a modified phenolic resin as claimed in claim 2, comprising:
   reacting a phenolic resin with at least one ester of orthosilicic acid in which 1, 2 or 3 alcohol residues are replaced by substituted or unsubstituted hydrocarbon residues.

18. The method as claimed in claim 17, further comprising:
   i. preparing a reaction mixture comprising or consisting of a high o,o'-resol, at least one alkyl ester of orthosilicic acid in which 1, 2 or 3 alcohol residues are replaced by substituted or unsubstituted hydrocarbon residues, and an acid having a pKa≤5, wherein the ratio of the amount of silicon to the weight of basic resin used lies in the range of from 0.5 to 20.0 mol of Si per kg of resin,
   ii. reacting to the mixture at a temperature in the range of from 20 to 120° C. with a reaction time in the range of from 1 minute to 20 hours,
   iii. neutralizing the reaction mixture reacted according to step ii,
   iv. distilling off the alcohol formed during the reaction according to step ii and optionally a solvent from the neutralized reaction mixture at reduced pressure.

19. The method as claimed in claim 17 wherein the phenolic resin comprises a phenol-formaldehyde high-o.o'-resol.

20. A cold-box or polyurethane no-bake method by producing foundry molds and/or cores, comprising:

providing a modified phenolic resin according to claim 2 as a binder or a constituent of a binder, wherein the modified phenolic resin comprises phenolic resin units which are substituted and/or linked by esters of orthosilicic acid in which 1, 2 or 3 alcohol residues are replaced by substituted or unsubstituted hydrocarbon residues, and/or can be produced by reacting free hydroxly groups of a phenolic resin with one or more esters of orthosilicic acid in which 1, 2 or 3 alcohol residues are replaced by substituted or unsubstituted hydrocarbon residues wherein the modified phenolic resin comprises high o,o'-resol units.

21. The method as claimed in claim 20, wherein the modified phenolic resin comprises phenolic resin units which are linked by esters of orthosilicic acid in which 1 or 2 alcohol residues are replaced by substituted or unsubstituted hydrocarbon residues.

22. The method as claimed in claim 20, wherein the modified phenolic resin is produced by reacting free hyrdoxyl groups of a phenolic resin with a dialkyldialkoxysilane.

23. The method as claimed in claim 20, wherein the modified phenolic resin is produced by reacting free hyrdoxyl groups of a high o,o'-resol with a dialkyldialkoxysilane.

24. The method as claimed in claim 20, wherein the modified phenolic resin is produced by reacting free hydroxyl groups of a phenol-formaldehyde high-o,o'-resol with a dialkyldialkoxysilane.

25. The method as claimed in claim 20, wherein, when heated in air to 1000° C. in a muffle furnace to constant mass, the modified phenolic resin gives an $SiO_2$ residue of from 1 percent by weight to 30 percent by weight, expressed in terms of the weight of the mass of modified phenolic resin used.

26. A method for producing a modified phenolic resin as claimed in claim 2, comprising:

reacting a phenolic resin with at least one ester of orthoslicic acid in which 1, 2 or 3 alcohol residues are replaced by substituted or unsubstituted hydrocarbon residues, wherein the phenolic resin is a high o,o'-resol.

27. The method as claimed in chum 26, further comprising:
i. preparing a reaction mixture comprising or consisting of a high o,o'-resol, at least one alkyl ester of orthosilicic acid in which 1, 2 or 3 alcohol residues are replaced by substituted or unsubstituted hydrocarbon residues, and an acid having a pKa≤5, wherein the ratio of the amount of silicon to the weight of basic resin used lies in the range of from 0.5 to 20.0 mol of Si per kg of resin,
ii. reacting the mixture at a temperature in the range of from 20 to 120° C. with a reaction time in the range of from 1 minute to 20 hours,
iii. neutralizing the reaction mixture reacted according to step ii,
iv. distilling off the alcohol formed during the reaction according to step ii and optionally a solvent from the neutralized reaction mixture at reduced pressure.

28. The method as claimed in claim 26, wherein the phenolic resin is a phenol-formaldahyde high o,o'-resol.

29. A method for producing a hardened foundry mold or a hardened foundry core according to the cold-box method, comprising:
i. producing a mixture comprising or consisting of a modified phenolic resin as clamed in claim 2, a polyisocyanate and a molding material,
ii. molding the mixture to form a foundry mold or a foundry core and
iii. hardening the molded mixture.

30. The method as claimed in claim 29, wherein the modified phenolic resin and/or the polyisocyanate are dissolved in a solvent before producing the mixture.

31. The method as claimed in claim 29 wherein the modified phenolic resin and/or the polyisocyanate are dissolved in a solvent comprising tetraethyl ester of orthosilicic acid before producing the mixture.

32. The method as claimed in claim 31, wherein the hardening step comprises use of a catalyst.

33. The method as claimed in claim 32, wherein the catalyst is an amine.

34. The method as claimed in claim 32, wherein the catalyst comprises a catalyst selected from the group consisting of triethylamine, dimethylethylamine and dimethylisopropylamine.

35. A two-component binder system, comprising or consisting of a phenolic resin component and a polyisocyanate component, wherein the polyisocyanate component comprises a polyisocyanate having at least two isocyanate groups per molecule and the phenolic resin component comprises a phenolic resin as claimed in claim 2.

36. A hardened foundry mold or a hardened foundry core, comprising a molding material and a hardened binder, the binder comprising a phenolic resin as claimed in claim 2.

* * * * *

UNITED STATES PATENT AND TRADEMARK OFFICE
CERTIFICATE OF CORRECTION

PATENT NO.       : 8,569,425 B2                                             Page 1 of 1
APPLICATION NO.  : 13/165267
DATED            : October 29, 2013
INVENTOR(S)      : David Strunk, Gerard Ladegourdie and Frank Lenzen It is certified that error appears in the above-identified patent and that said Letters Patent is hereby corrected as shown below:

In the Claims

In column 32, line 67, of claim 19, reads "high-o.o'-resol." should read "high-o,o'-resol."
In column 33, line 32, of claim 25, reads "1000° C.", should read "1000° C"

Signed and Sealed this
Fifteenth Day of July, 2014

Michelle K. Lee
*Deputy Director of the United States Patent and Trademark Office*